(12) United States Patent
Tucker et al.

(10) Patent No.: US 11,535,002 B2
(45) Date of Patent: Dec. 27, 2022

(54) FILMS AND BAGS WITH BILLOW POCKETS FOR CAPTURING LIQUIDS

(71) Applicant: THE GLAD PRODUCTS COMPANY, Oakland, CA (US)

(72) Inventors: Edward B. Tucker, Willowbrook, IL (US); Robert T. Dorsey, Willowbrook, IL (US); Michael G. Borchardt, Naperville, IL (US); Ranyi Zhu, Naperville, IL (US); Deborah K. Fix, Maineville, OH (US); Zeljko Vidovic, Willowbrook, IL (US); Lehai Vu, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 246 days.

(21) Appl. No.: 16/869,230

(22) Filed: May 7, 2020

(65) Prior Publication Data

US 2020/0262172 A1 Aug. 20, 2020

Related U.S. Application Data

(63) Continuation-in-part of application No. PCT/US2018/059008, filed on Nov. 2, 2018.
(Continued)

(51) Int. Cl.
*B32B 3/28* (2006.01)
*B32B 3/30* (2006.01)
(Continued)

(52) U.S. Cl.
CPC .......... *B32B 3/28* (2013.01); *B29C 55/08* (2013.01); *B29C 55/18* (2013.01); *B29D 7/01* (2013.01);
(Continued)

(58) Field of Classification Search
CPC .. B32B 3/28; B32B 3/30; B32B 27/08; B32B 7/05; B32B 37/0038; B32B 2274/00; B32B 2307/7145; B32B 7/12; B32B 27/285; B32B 27/306; B32B 2250/02; B32B 2250/24; B32B 27/308; B32B 27/32;
(Continued)

(56) References Cited

U.S. PATENT DOCUMENTS 4,469,735 A 9/1984 Trokhan
5,468,428 A 11/1995 Hanschen et al.
(Continued)

*Primary Examiner* — Nathan L Van Sell
(74) *Attorney, Agent, or Firm* — Keller Preece PLLC

(57) ABSTRACT

A multiple-ply thermoplastic film which exhibits elastic-like behavior along at least one axis when stretched or elongated and then released. The thermoplastic film comprises a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and plurality of web areas are arranged in a complex pattern. The complex pattern, when stretched or elongated and then released, can cause areas of billowing and delamination between plies of the multiple-ply thermoplastic film. The resulting billowed and delaminated areas form billow pockets for capturing liquids that can capture liquids when one of the plies is punctured.

16 Claims, 19 Drawing Sheets

Related U.S. Application Data

(60) Provisional application No. 62/583,108, filed on Nov. 8, 2017.

(51) Int. Cl.

| | | |
|---|---|---|
| *B32B 27/08* | (2006.01) | |
| *B65F 1/00* | (2006.01) | |
| *B65D 65/40* | (2006.01) | |
| *B32B 7/05* | (2019.01) | |
| *B32B 37/00* | (2006.01) | |
| *B29C 55/08* | (2006.01) | |
| *B29C 55/18* | (2006.01) | |
| *B29D 7/01* | (2006.01) | |
| *B31B 70/00* | (2017.01) | |
| *B31B 70/88* | (2017.01) | |
| *B31B 170/20* | (2017.01) | |
| *B31B 155/00* | (2017.01) | |
| *B31B 70/86* | (2017.01) | |

(52) U.S. Cl.
CPC ............ *B31B 70/008* (2017.08); *B31B 70/88* (2017.08); *B32B 3/30* (2013.01); *B32B 27/08* (2013.01); *B65D 65/403* (2013.01); *B65F 1/0006* (2013.01); *B31B 70/866* (2017.08); *B31B 2155/002* (2017.08); *B31B 2155/0014* (2017.08); *B31B 2170/20* (2017.08); *B32B 7/05* (2019.01); *B32B 37/0038* (2013.01); *B32B 2274/00* (2013.01); *B32B 2307/7145* (2013.01); *B65F 2250/114* (2013.01)

(58) Field of Classification Search
CPC .............. B32B 27/34; B32B 2264/101; B32B 2264/102; B32B 2264/108; B32B 27/205; B32B 27/36; B32B 27/302; B32B 27/40; B32B 2264/104; B32B 2270/00; B32B 2307/518; B32B 2307/54; B32B 2307/7163; B32B 2439/06; B32B 2553/00; B32B 2555/02; B29C 55/08; B29C 55/18; B29D 7/01; B31B 70/008; B31B 70/88; B31B 70/866; B31B 2155/0014; B31B 2155/002; B31B 2170/20; B65D 65/403; B65F 1/0006; B65F 2250/114; B31F 2201/00; B31F 2201/0741; B31F 2201/0751; B31F 2201/0764

See application file for complete search history.

(56) References Cited

U.S. PATENT DOCUMENTS

| | | |
|---|---|---|
| 5,518,801 A | 5/1996 | Chappell et al. |
| 5,650,214 A | 7/1997 | Anderson et al. |
| 2002/0003910 A1 | 1/2002 | Jackson |
| 2002/0095127 A1* | 7/2002 | Fish .................. A61F 13/5323 604/385.01 |
| 2012/0039550 A1* | 2/2012 | MacPherson ........... B32B 27/00 428/167 |
| 2012/0063706 A1 | 3/2012 | Fraser et al. |
| 2012/0123370 A1 | 5/2012 | Melik et al. |
| 2013/0011084 A1 | 1/2013 | Broering et al. |
| 2014/0023829 A1 | 1/2014 | Broering et al. |
| 2016/0235592 A1 | 8/2016 | Coe et al. |
| 2016/0271864 A1 | 9/2016 | Dorsey et al. |

* cited by examiner

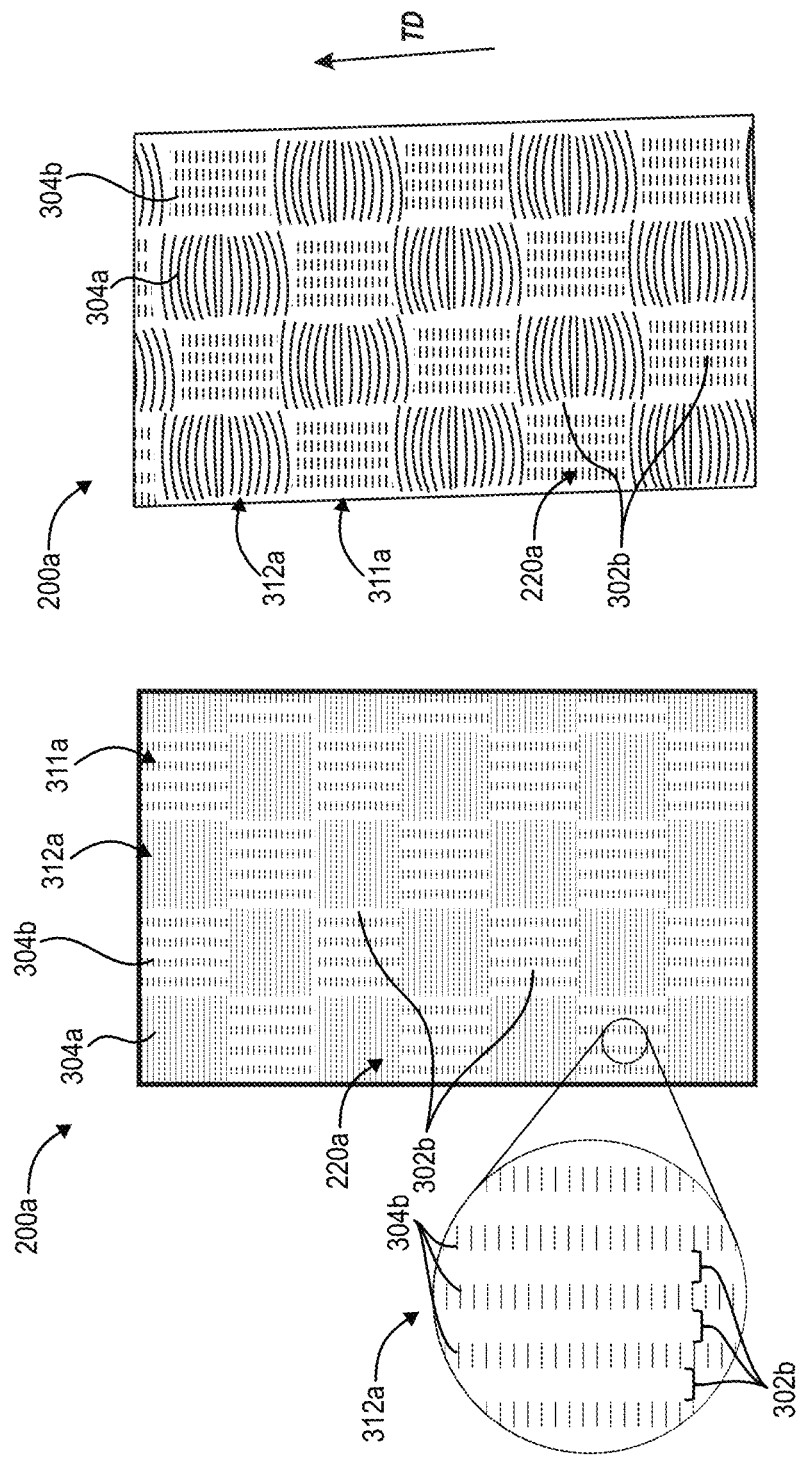

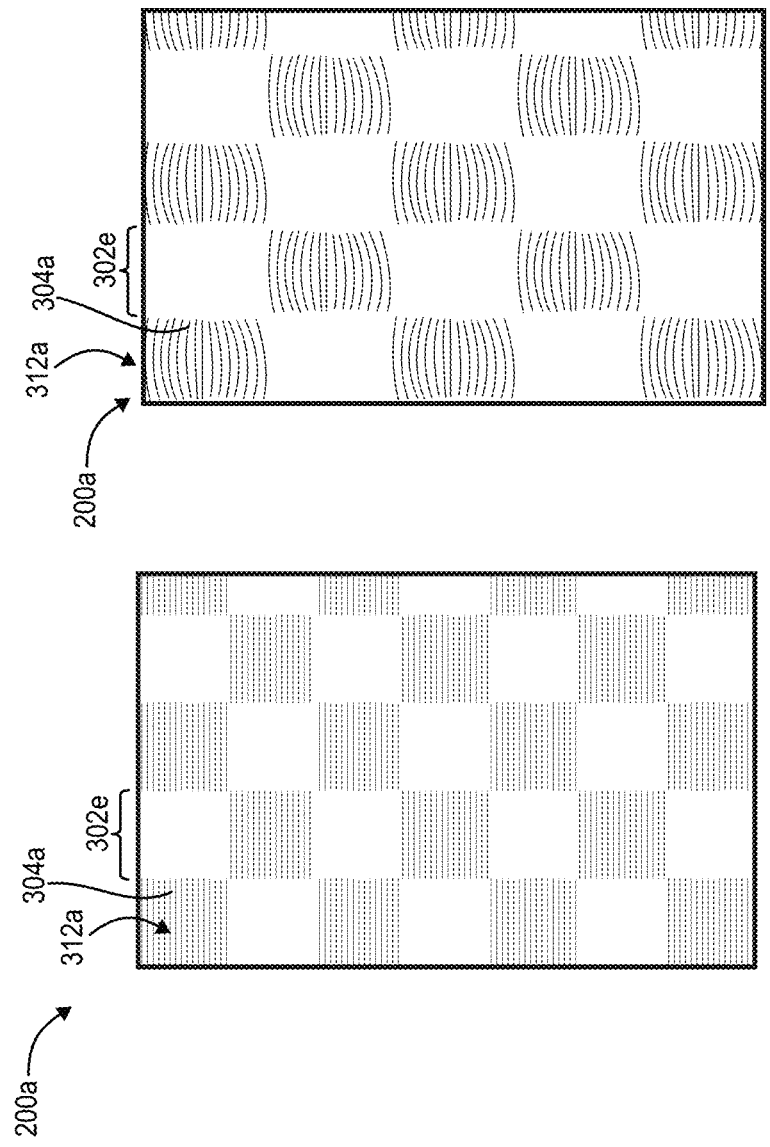

FILMS AND BAGS WITH BILLOW POCKETS FOR CAPTURING LIQUIDS

CROSS-REFERENCE TO RELATED APPLICATIONS

The present application is a continuation-in-part of International Application No. PCT/US18/59008, filed on Nov. 2, 2018 and entitled: FILMS AND BAGS HAVING LOW-FORCE EXTENSION PATTERNS, which claims the benefit of and priority to U.S. Provisional Application No. 62/583,108, filed Nov. 8, 2017 and entitled: THERMOPLASTIC FILMS AND BAGS WITH COMPLEX STRETCH PATTERNS AND METHODS OF MAKING THE SAME. The contents of the above-referenced application are hereby incorporated by reference in their entirety.

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One-way manufacturers may attempt to reduce production costs is to stretch the thermoplastic film, thereby increasing its surface area and reducing the amount of thermoplastic film needed to produce a product of a given size.

While thinner gauge materials can represent cost savings to the manufacturer, the use of thinner gauge films can result in lower durability. This is particularly problematic in relation to thinner gauge films used in grocery bags, trash bags, and other types of sacks. For example, when the contents of a bag or sack include a liquid component (e.g., as with kitchen garbage), less durable and more easily punctured films often lead to leaks.

Leaky bags and sacks quickly give rise to customer perception of low quality and can make the bags and sacks unfit for their intended purpose. For example, when liquid waste leaks out of a punctured trash bag, customers are left with a messy cleanup. Additionally, leaky trash bags lead to the permeation of smells that can be difficult to get rid of.

Accordingly, there are various considerations to be made with regard to thermoplastic films and products formed therefrom.

BRIEF SUMMARY

One or more implementations of the present disclosure solve one or more problems in the art with multiple-ply thermoplastic films with complex stretch patterns that provide billow pockets for capturing liquids and apparatus and methods for creating the same. For example, the complex stretch patterns can provide loft between plies of the thermoplastic films so as to create billow pockets for capturing liquids as the films are elongated, subjected to a load, or otherwise stretched. More specifically, the complex stretch pattern causes first portions of the thermoplastic film to deform though expansion in the direction of an applied force while second portions resist deformation in the direction of the applied force. Additionally, in one or more implementations the difference in deformation between first and second portions can cause the first portions to billow when stretched/elongated and subsequently released thereby providing the film with greater loft. In one or more implementation, the plies of the thermoplastic films separate in the first portions after billowing so as to create pockets for capturing liquids in the billowed portions.

One or more implementations of the present disclosure includes a thermoplastic film with one or more strainable networks formed by a structural elastic like process. The thermoplastic film includes a laminate with a first layer lightly-bonded to a second layer, a plurality of raised rib-like elements, and a plurality of land areas positioned about the plurality of raised rib-like elements, where the plurality of land areas extend in a first direction. When subjected to an applied force in a direction parallel to the first direction, the plurality of raised rib-like elements and the plurality of land areas are sized and positioned such that the first layer and the second layer delaminate between the raised rib-like elements to create billow pockets for capturing liquid.

One or more additional implementations include a thermoplastic bag exhibiting billow pockets. The thermoplastic bag includes a first sidewall and a second sidewall joined together along a first side edge, a second side edge, and a bottom edge, and an opening opposite the bottom edge. Each of the first sidewall and the second sidewall include a laminate including a first layer lightly-bonded to a second layer, a plurality of raised rib-like elements, and a plurality of land areas positioned about the plurality of raised rib-like elements, the plurality of land areas extending in a first direction. When the thermoplastic bag is subjected to an applied force in a direction parallel to the first direction, the first layer and the second layer delaminate between the raised rib-like elements to create billow pockets for capturing liquid.

One or more additional implementations include a method for making a thermoplastic film exhibiting billow pockets. The method includes passing a first layer and a second layer of a thermoplastic film between a first intermeshing roller and a second intermeshing roller to create a lightly-bonded laminate, wherein at least one of the first intermeshing roller and the second intermeshing roller comprises a repeat unit of a plurality of ridges, a plurality of notches, and a plurality of grooves. The repeat unit causes creation of a complex stretch pattern in the thermoplastic film, the complex stretch pattern comprising a plurality of raised rib-like elements and a plurality of land areas that extend in a first direction. The plurality of raised rib-like elements and the plurality of land areas are sized and positioned such that, when subjected to the applied force in the first direction, the first layer and the second layer of the thermoplastic film delaminate between the raised rib-like elements to create billow pockets for capturing liquid.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 9A shows a front view of a film with a complex stretch pattern in the form of micro and macro patterns with land areas parallel to the direction of applied force according to one or more implementations of the present disclosure;

FIG. 9B shows a front view of the film of FIG. 9A after having been subjected to an applied, and subsequently released, strain that creates billow pockets for capturing liquids according to one or more implementations of the present disclosure;

FIG. 10A shows a front view of a film with land areas that provide for billow pockets for capturing liquids according to one or more implementations of the present disclosure;

FIG. 10B shows a front view of the film of FIG. 10A after having been subjected to an applied, and subsequently released, strain with billow pockets for capturing liquids according to one or more implementations of the present disclosure;

DETAILED DESCRIPTION

Figure 1C:
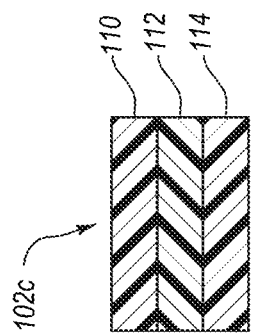
FIGS. 1A-1C show partial side cross-sectional views of films having varying numbers of sublayers according to one or more implementations of the present disclosure.

One or more implementations of the present disclosure include multiple-ply thermoplastic films with complex structural elastic-like film (SELF) patterns. As described below, the complex stretch or SELF patterns provide the multiple-ply thermoplastic films, and products made therefrom, with various advantages. For example, the complex SELF patterns can provide loft between plies of the thermoplastic films so as to create billow pockets for capturing liquids as the films are elongated, subjected to a load, or otherwise stretched.

The billow pockets for capturing liquids can provide various advantages. For example, the space between the inner ply and the outer ply created by the billow pockets for capturing liquids can help prevent puncturing of the outer layer when trash is stuffed into a bag. As such, when the inner ply is punctured or otherwise compromised, the outer ply can remain uncompromised. Subsequently liquid from waste can pass through the inner ply into the billow pocket for capturing liquids, and thereby, become trapped between the inner ply and the outer ply. By trapping the liquid, the billow pockets for capturing liquids can prevent or reduce liquid from undesirably escaping from the bag.

In addition to the foregoing, often liquid waste can cause unpleasant odors. In addition to preventing leaks, by trapping liquid waste between the plies of bag, the billow pockets for capturing liquids can prevent or reduce malodors from escaping the bag. Furthermore, in one or more implementations, the billow pockets for capturing liquids can be fluidly connected. In this manner, liquid introduced into billow pockets for capturing liquids at the top or middle of the bag can gradually travel down to billow pockets for capturing liquids in the bottom of the bag. By channeling liquid waste to the bottom of the bag, the billow pockets for capturing liquids can further reduce escape of malodors from the top of the bag, which is typically closer to users during removal and disposal of the bag.

Additionally, in some implementations, the outer ply can be transparent or translucent such that any liquid trapped in one or more billow or billow pockets for capturing liquids is visible from the outside of the bag. The ability to see liquid in the billow pockets for capturing liquids can signal to a user that the billow pockets for capturing liquids are working and trapping liquid. Moreover, depending on the arrangement of the complex stretch or SELF patterns, trapped liquid in one or more billow pockets may travel toward the bottom of the bag. This is especially advantageous when a user can see the trapped traveling away from the opening of the garbage bag.

As mentioned, one or more implementations include multiple-ply thermoplastic films with strainable networks created by SELF'ing process to allow for the creation of billow pockets for capturing liquids. The strainable network can comprise a plurality of raised rib-like elements extending in a direction perpendicular to a main surface of the multiple-ply thermoplastic film. The raised rib-like elements are surrounded by a plurality of web or land areas. The raised rib-like elements and web areas can comprise a strainable network that provides the multiple-ply thermoplastic film with an elastic-like behavior. In particular, when subjected to an applied load, two or more plies of the thermoplastic film can delaminate and create billow pockets for capturing liquids as the raised rib-like elements initially undergo a substantially geometric deformation before undergoing substantial molecular-level deformation when subjected to an applied load. On the other hand, two or more plies of the thermoplastic film can remain laminated as the web or land areas undergo a substantially molecular-level and geometric deformation in response to the applied strain. U.S. Pat. Nos. 5,518,801 and 5,650,214 each disclose processes for forming strainable networks using SELF'ing processes. The contents of each of the aforementioned patents are incorporated in their entirety by reference herein.

In addition to the elastic-like characteristics mentioned above and the other benefits described in the above incorporated patents, implementations of the present disclosure include sized and positioned strainable networks in complex patterns that provide previously unrealized multiple-ply film properties and characteristics. For example, one or more implementations include sizing and positioning the plurality of raised rib-like elements and the plurality of web or land areas such that, when subjected to an applied load, the films delaminate and create billow pockets for capturing liquids. Thus, complex patterns of raised rib-like elements and land areas can provide various benefits, such as specific delamination and billowing that leads to the creation of billow pockets for capturing liquids.

Additionally, one or more implementations include sizing and positioning the plurality of raised rib-like elements and the plurality of land areas such that, when subjected to an applied and subsequently released load, billows form between plies of the multiple-ply thermoplastic film. In some implementations, the billows form between the plies of the multiple-ply thermoplastic film to create billow pockets for capturing liquids. For example, in some implementations, the billow pockets when two or more plies of the thermoplastic film delaminate in areas where the plurality of raised rib-like elements are positioned. The resulting billow pockets are thus positioned between the land areas in the thermoplastic film. When at least one ply of the thermoplastic film is punctured in an area of the film including a billow pocket, fluid may collect in the billow pocket. This is particularly advantageous when the multiple-ply thermoplastic film is formed into a bag such as a garbage bag. In that implementation, the garbage bag formed from the multiple-ply thermoplastic film can effectively prevent garbage leaks and unpleasant odors.

One or more implementations of the present disclosure include products made from or with such multiple-ply thermoplastic films with complex SELF patterns that enable the formation of billow pockets for retaining leaks. For example, such products include, but are not limited to, grocery bags, trash bags, sacks, and packaging materials, feminine hygiene products, baby diapers, adult incontinence products, or other products. For ease in description, the figures and bulk of the following disclosure focuses on films and bags. One will appreciate that teachings and disclosure equally applies to other products.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene-based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly (ethylene-butylacrylate), polyurethane, poly(ethylene-propylene-diene), ethylene-propylene rubber, nylon, etc.

Some of the examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; p=0.920). Additionally, other examples use a gas phase LLDPE, which is a hexene gas phase LLDPE formulated with slip/AB (MI=1.0; p=0.920). Still further examples use a gas phase LLDPE, which is a hexene gas phase LLDPE formulated with slip/AB (MI=1.0; p=0.926). One will appreciate that the present disclosure is not limited to LLDPE and can include "high density polyethylene" (HDPE), "low density polyethylene" (LDPE), and "very low-density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single ply or multiple plies. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, resin formulations, surface constituents, or tackifying adjuvants (e.g., tackifying agents). For example, the ease with which delamination between plies occurs can be controlled by resin formulation, tackifying adjuvants, or surface constituents. In one or more implementations, the tackifying agent comprises an ultra low-density polyethylene (e.g., with a 3.0 melt index, 0.875 density, barefoot). For example, the tackifying agent can comprise an ultra low-density polyethylene known commercial as Dow Affinity KC8852 ULDPE. More specifically, in one or more implementations, the film comprises substantially LLDPE (e.g., 90% by weight or more) with 5% or less of a tackifying agent. In particular, in one or more implementations, the film comprises 2% or less of a tackifying agent. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films. Additional additives may include antimicrobial agents.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, corona lamination, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
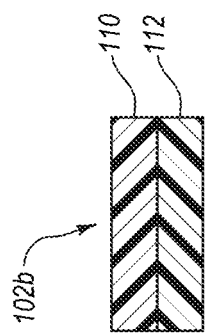
Figure 1A:
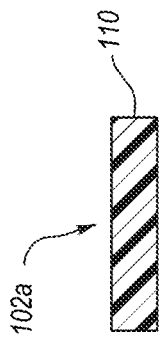

Films having a complex stretch pattern can may include a single film formed from one, two, three, or more layers of thermoplastic material. FIGS. 1A-1C are partial cross-sectional views of multi-layer or multi-ply films into which a complex stretch pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios. Moreover, in any of the multi-ply films illustrated in FIG. 1B or 1C, the layers 110, 112, and/or 114 may include the same thickness or different thicknesses.

Typically, the stretchable portion of a complex stretch pattern comprises an area that is SELF'ed or stretched by opposing rollers in a process known as transverse direction ring rolling (TDRR). The rollers comprise a collection of machine direction (MD) oriented embossing elements (e.g., rib-like elements or any other pattern). Two opposing rollers form a compression nip to emboss the film such that the film is thinned between the ribs. Thus, the film is susceptible to greater deformation via expansion in the transverse direction (TD) direction during TD tensile stress owing to these pre-thinned areas of film that occur in bands parallel with the MD. Generally, these pre-thinned areas impart the visible perception of stretch.

Figure 2:
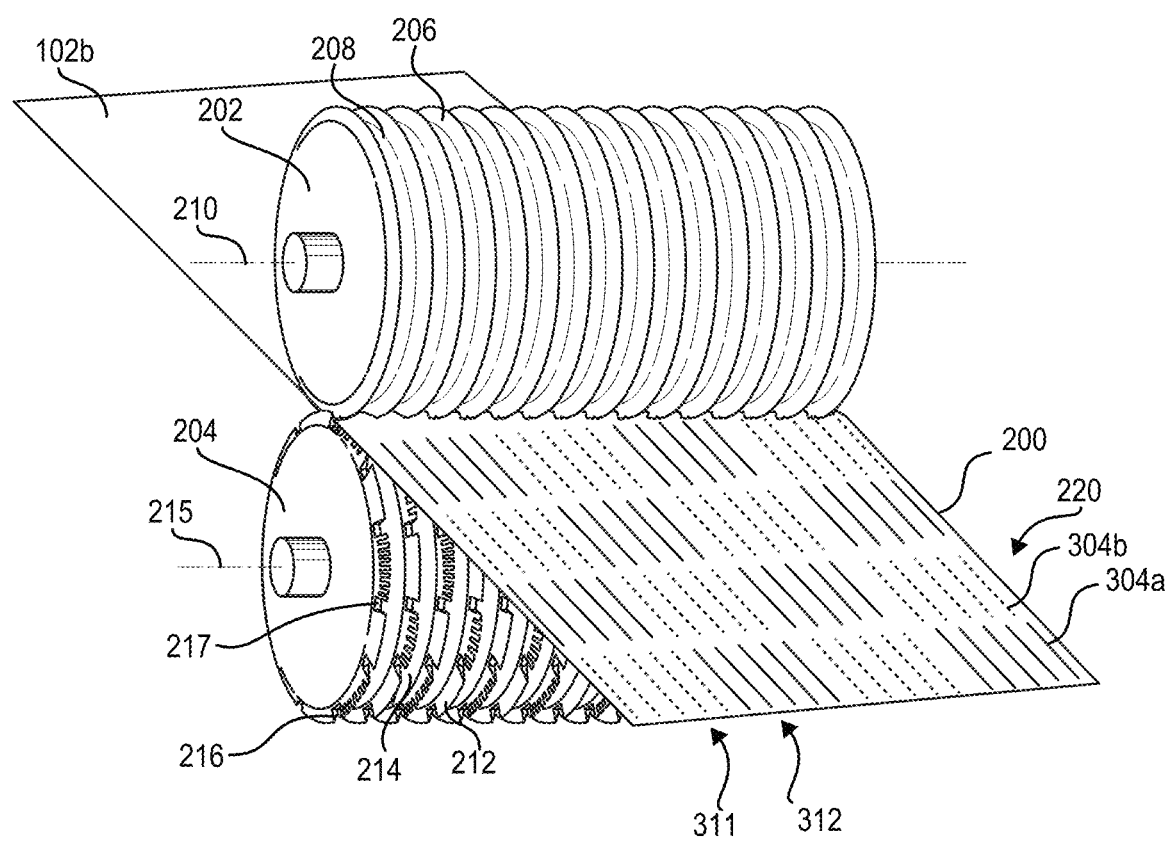
FIG. 2 shows a perspective view of a pair of SELF'ing rollers utilized to form films with billow pockets for capturing liquids according to one or more implementations of the present disclosure.

For example, FIG. 2 shows a pair of SELF'ing intermeshing rollers 202, 204 (e.g., a first SELF'ing intermeshing roller 202 and a second SELF'ing intermeshing roller 204) for creating strainable networks with complex patterns. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein. The second SELF'ing intermeshing roller 204 can also include a plurality of ridges 212 and grooves 214 extending generally radially outward in a direction orthogonal to an axis of rotation 215. As shown in FIG. 2, in some embodiments, the ridges 216 of the second SELF'ing intermeshing roller 204 may include a plurality of notches 217 that define a plurality of spaced teeth 216.

As shown by FIG. 2, passing a film, such as film 102b, through the SELF'ing intermeshing rollers 202, 204 can produce a multiple-ply thermoplastic film 200 with one or more strainable networks formed by a structural elastic like process in which the strainable networks have a complex pattern 220 in the form of a checkerboard pattern. As used herein, the term "strainable network" refers to an interconnected and interrelated group of regions which are able to be extended to some useful degree in a predetermined direction providing the web material with an elastic-like behavior in response to an applied and subsequently released elongation.

Figure 3:
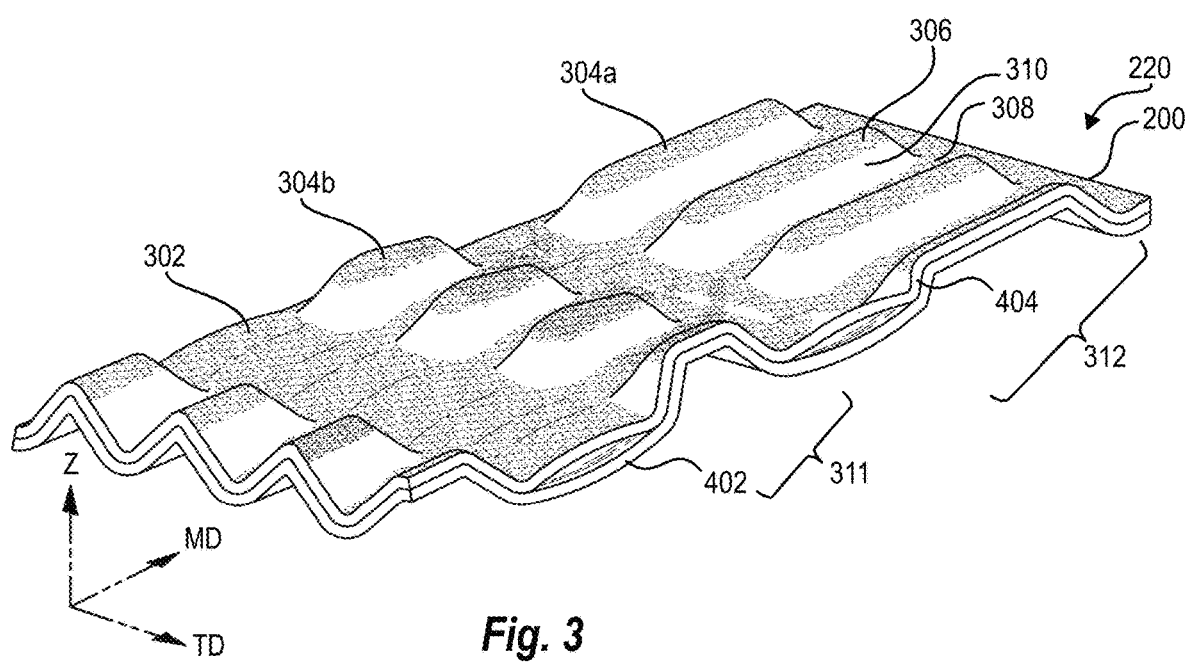
FIG. 3 shows a perspective view of a multi-layer SELF'ed film having a complex stretch pattern according to one or more implementations of the present disclosure.

FIG. 3 shows a portion of the multiple-ply thermoplastic film 200 with the complex stretch pattern 220. Referring to FIGS. 2 and 3 together, as the film passes through the SELF'ing intermeshing rollers 202, 204, the teeth 216 can press a portion of the film out of plane defined by the film to cause permanent deformation of a portion of the film in the Z-direction. For example, the teeth 216 can intermittently stretch a portion of the film 102b in the Z-direction. The portions of the film 102b that pass between the notched regions 217 of the teeth 216 will remain substantially unformed in the Z-direction. As a result of the foregoing, the multiple-ply thermoplastic film 200 with the complex stretch pattern 220 includes a plurality of isolated deformed, raised, rib-like elements 304a, 304b and at least one un-deformed portion (e.g., sometimes referred to as a web area or land area) 302 (e.g., a relatively flat region). As will be understood by one of ordinary skill in the art, the length and width of the rib-like elements 304a, 304b depend on the length and width of teeth 216 and the speed and the depth of engagement of the intermeshing rollers 202, 204. The rib-like elements 304a, 304b and the un-deformed land areas 302 form a strainable network.

As shown in FIG. 3, the strainable network of the multiple-ply thermoplastic film 200 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304a, 304b of the strainable network. In one or more embodiments, the first thicker regions 306 are the portions of the film with the greatest displacement in the Z-direction. In one or more embodiments, because the film is displaced in the Z-direction by pushing the rib-like elements 304a, 304b in a direction perpendicular to a main surface of the thermoplastic film (thereby stretching the regions 310 upward) a total length and width of the film does not substantially change when the film is subjected to the SELF'ing process of one or more embodiments of the present invention. In other words, the film 102c (film prior to undergoing the SELF'ing process) can have substantially the same width and length as the multiple-ply thermoplastic film 200 resulting from the SELF'ing process.

As shown by FIG. 3, the rib-like elements can have a major axis and a minor axis (i.e., the rib-like elements are elongated such that they are longer than they are wide). As shown by FIGS. 2 and 3, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 304a, 304b can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304a, 304b can undergo geometric deformation before undergoing molecular-level deformation. For example, a strain applied to the multiple-ply thermoplastic film 200 in a perpendicular to the major axes of the rib-like elements 304a, 304b can pull the rib-like elements 304a, 304b back into plane with the web areas 302 prior to any molecular-level deformation of the rib-like elements 304a, 304b. Geometric deformation can result in significantly less resistive forces to an applied strain than that exhibited by molecular-level deformation. Moreover, upon application of a force and depending on the density of rib-like elements within the complex stretch pattern, the first thermoplastic film layer 402 and the second thermoplastic film layer 404 can delaminate (e.g., become unbonded) in the areas including the rib-like elements 304a, 304b.

As mentioned above, the rib-like elements 304a, 304b and the land areas 302 can be sized and positioned so as to create a complex stretch pattern. The complex stretch pattern can provide specific areas of delamination, or one or more of the benefits discussed herein. For example, the complex stretch pattern can cause a film (when subjected to an applied load) to delaminate between layers creating pockets in-between billows with one or more of heights greater than 3000 micrometers or widths greater than 3000 micrometers.

As shown by FIG. 2, groups of rib-like elements 304a, 304b can be arranged in different arrangements to form a complex stretching pattern. For example, a first plurality of raised rib-like elements 304a can be arranged in a first pattern 312 and a second plurality of raised rib-like elements 304b arranged in a second pattern 311. The first and the second patterns 312, 311 of raised rib-like elements 304a, 304b can repeat across the multiple-ply thermoplastic film 200. As shown by FIG. 2, first and the second patterns 312, 311 of raised rib-like elements 304a, 304b can form a checkerboard pattern 220.

In one or more implementations, the first pattern 312 is visually distinct from the second pattern 311. As used herein, the term "visually distinct" refers to features of the web material which are readily discernible to the normal naked eye when the web material or objects embodying the web material are subjected to normal use.

In one or more embodiments, the first pattern 312 of raised rib-like elements 304a comprises a macro pattern while the second pattern 311 of raised rib-like elements 304b comprises a micro pattern. As used herein a macro pattern is a pattern that is larger in one or more ways than a micro pattern. For example, as shown by FIG. 2, the macro pattern 312 has larger/longer raised rib-like elements 304a than the raised rib-like elements 304b of the micro pattern 312. In alternative embodiments, the surface area of a given macro pattern 312 covers more surface area than a surface area covered by a given micro pattern 311. In still further embodiments, a macro pattern 312 can include larger/wider web portions between adjacent raised rib-like elements than web portions between adjacent raised rib-like elements of a micro pattern 311. Additionally, in at least one implementation the micro pattern 311 may be completely void of any ribbing.

As mentioned above, the raised rib-like elements 304a are longer than the raised rib-like elements 304b. In one or more embodiments, the raised rib-like elements 304a have a length at least 1.5 times the length of the raised rib-like elements 304b. For example, the raised rib-like elements 304a can have a length between 1.5 and 20 times the length of the raised rib-like elements 304b. In particular, the raised rib-like elements 304a can have a length 2, 3, 4, 5, 6, 8, or 10 times the length of the raised rib-like elements 304b.

In one or more implementations, the films with a complex stretch pattern may comprise two or more distinct thermoplastic films or layers (i.e., two films extruded separately). The distinct thermoplastic films can be non-continuously bonded to one another. For example, in one or more embodiments two film layers can be passed together through a pair of SELF'ing rollers to produce a multi-layered lightly-bonded laminate film 200 with the complex stretch pattern 220, as shown in FIG. 3. The multi-layered lightly-bonded laminate film 200 can comprise a first thermoplastic film 402 lightly-bonded bonded to a second thermoplastic film 404. In one or more embodiments, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding (e.g., ring rolling, SELFing, embossing), ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

In one or more embodiments, the first and second films 402, 404 may be discontinuously and lightly bonded together via one or more of the methods of bonding films together as described in U.S. Pat. No. 8,603,609, the disclosure of which is incorporated in its entirety by reference herein. In particular, the first and second films 402, 404 may be bonded via one or more of MD rolling, TD rolling, DD ring rolling, SELF'ing, pressure bonding, corona lamination, adhesives, or combinations thereof. In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may can also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

Figure 4A:
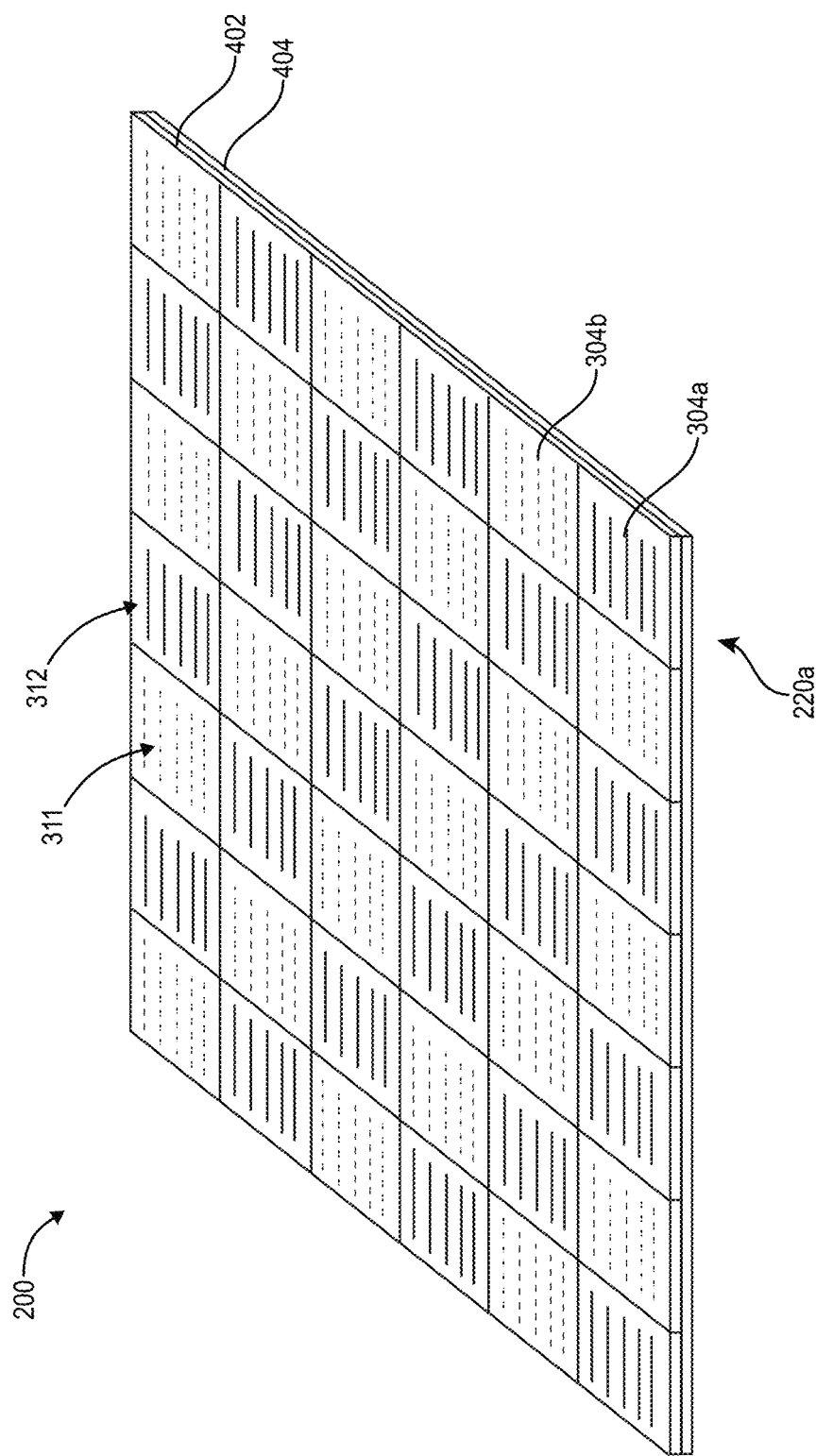
FIG. 4A shows a partial perspective view of a multiple-ply film having a complex stretch pattern in the form of a checkerboard pattern according to one or more implementations of the present disclosure.
Figure 4B:
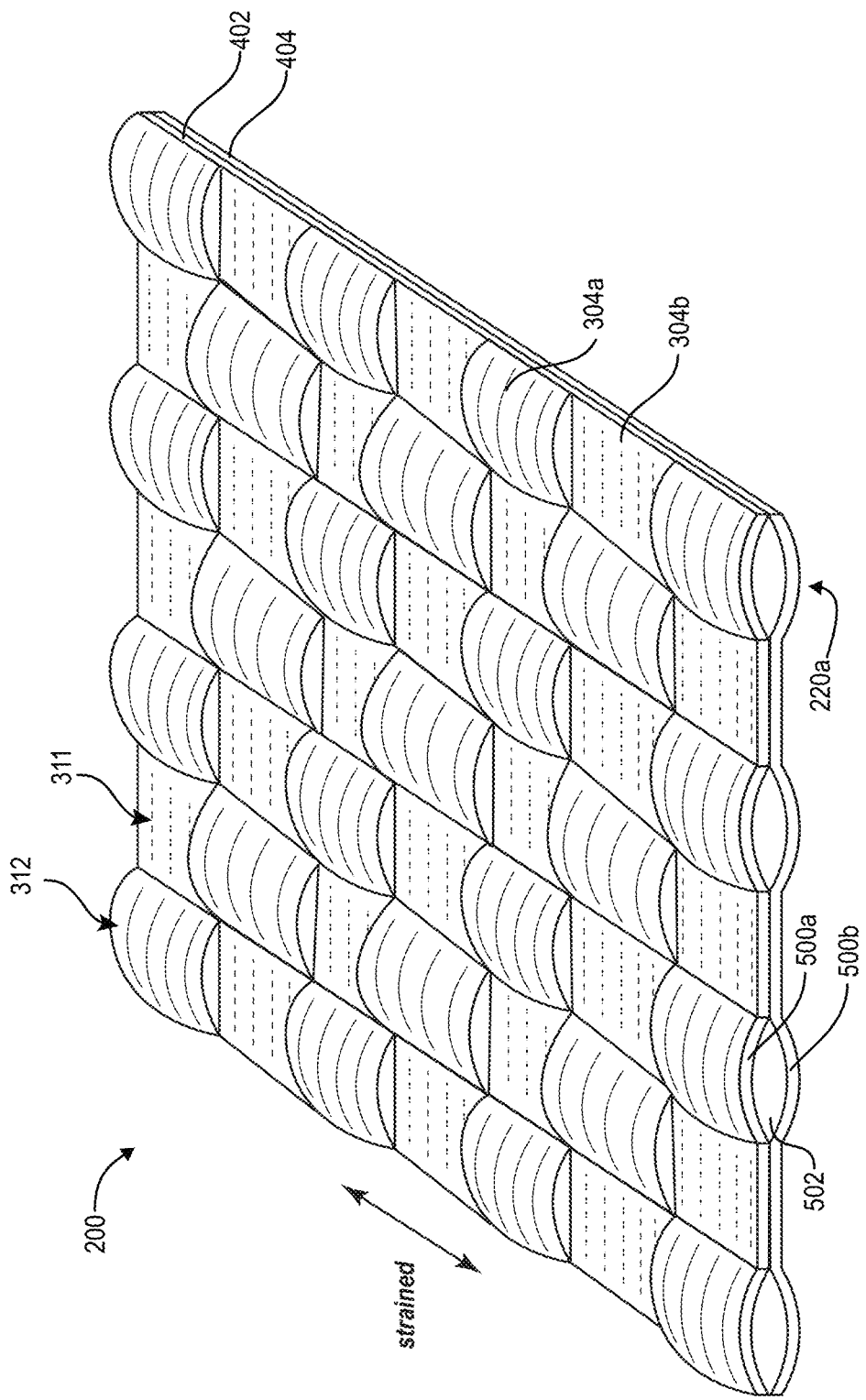
FIG. 4B shows a partial perspective view of the multiple-ply film of FIG. 4A after having been subjected to an applied, and subsequently released, load to create billow pockets for capturing liquids according to one or more implementations of the present disclosure.
Figure 4C:
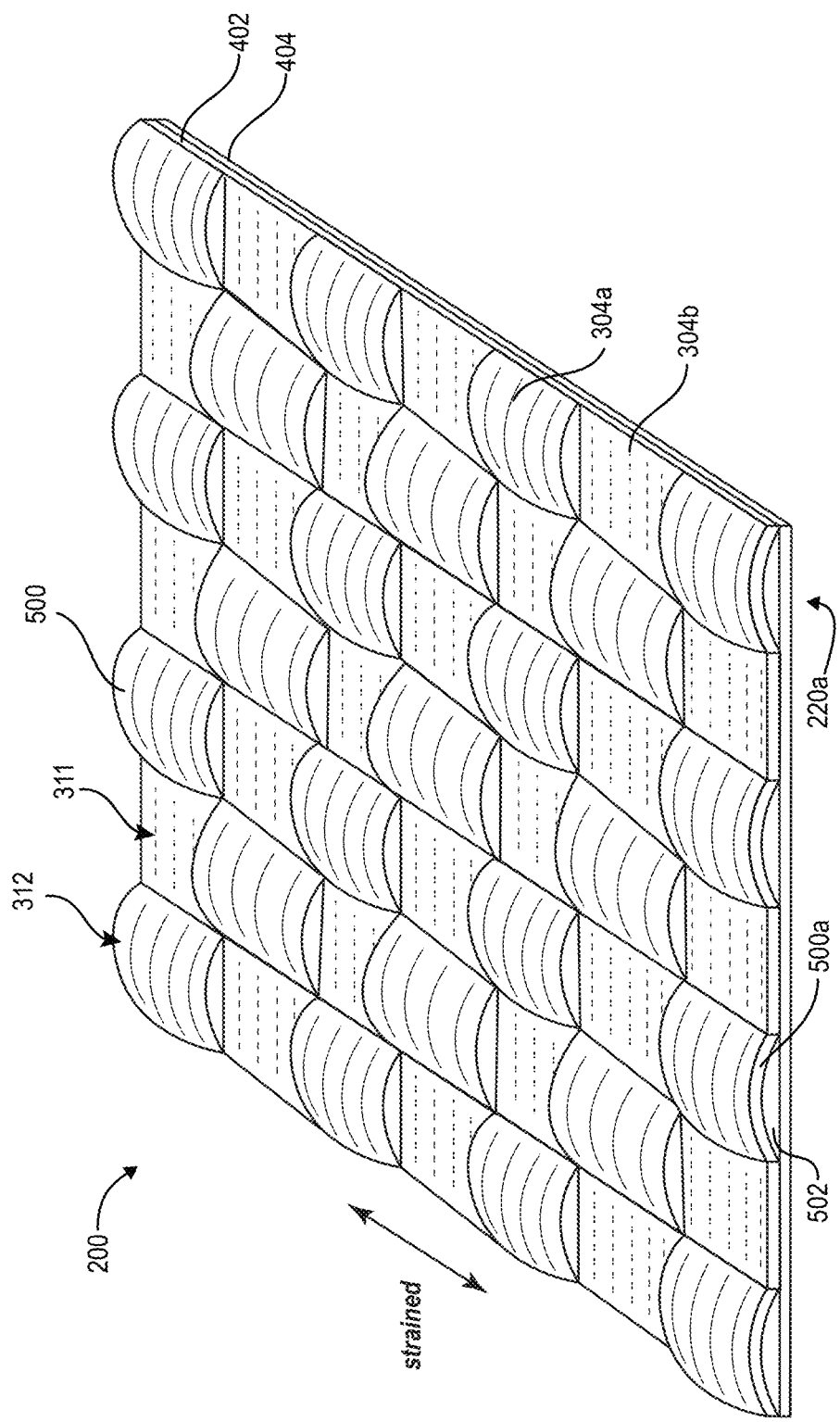
FIG. 4C shows a partial perspective view of the multiple-ply film of FIG. 4A after having been subjected to an applied, and subsequently released, load to create billow pockets for capturing liquids according to one or more implementations of the present disclosure.

Additional details of the benefits of a complex stretch pattern that leads to the creation of billows and associated billow pockets for capturing liquids will be described in relation to FIGS. 4A-4C. FIG. 4A is a perspective view of a portion of the multiple-ply thermoplastic film 200 with the complex stretch pattern 220a in an unstrained configuration (i.e., prior to being subjected to an applied load). FIGS. 4B and 4C are perspective views of a portion of the multiple-ply thermoplastic film 200 with the complex stretch pattern 220a after having been strained (i.e., after having been subjected to an applied and subsequently released load), thereby, creating billows and associated billow pockets for capturing liquids.

As shown, after the load is released the multiple-ply thermoplastic film 200 returns, to a substantial degree, to its condition prior to being subjected to the load. As shown by a comparison of FIGS. 4B-4C, in some implementations, when subjected to an applied and subsequently released load, billow pockets for capturing liquids 502 are formed in the multiple-ply thermoplastic film 200. The billow pockets for capturing liquids 502 may at least partially extend outward from the plane of the multiple-ply thermoplastic film 200 and may form a protruding shape. For example, the billow pockets for capturing liquids 502 may have a general square dome shape (i.e., a dome having a square base). One will appreciate that the configuration of the billow pockets for capturing liquids 502 can be based on a given complex stretch pattern.

As shown in FIGS. 4B and 4C, the billow pockets for capturing liquids 502 are in areas of the thermoplastic film comprising the first pattern 312 (e.g., macro pattern) of raised rib-like elements while areas comprising the second pattern 311 (e.g., micro pattern) of raised rib-like elements lack billows with heights greater than 3000 micrometers. Thus, the areas of the thermoplastic film comprising the first pattern 312 of raised rib-like elements can have a first resistance to stretching. The areas of the thermoplastic film comprising the second pattern 311 of raised rib-like elements can have a second resistance to stretching that is greater than the first resistance to stretching as explained in greater detail below.

Additionally, the billow pockets for capturing liquids 502 (e.g., areas of the thermoplastic film comprising the first pattern 312 of raised rib-like elements) have a first visual characteristic. The un-billowed areas (e.g., areas of the thermoplastic film comprising the second pattern 311 of raised rib-like elements) have a second visual characteristic that differs from the first visual characteristic. For example, the billow pockets for capturing liquids 502 can have a different color, sheen, haze, transparency, refractivity, etc. The differing visual characters can cause the billows to pop or otherwise visually stand out.

As mentioned above, when objected to force or strain, the first and second films 402, 404 of the multiple-ply thermoplastic film 200 can delaminate and delaminate to form billow pockets for capturing liquids 502. For example, as shown in FIG. 4B, when strained, the first film 402 forms billows, such as the billow 500a, in areas including the first pattern 312 of the plurality of raised rib-like elements 304a. Similarly, as shown in FIG. 4B, when strained, the second film 404 forms billows, such as the billow 500b, in areas including the first pattern 312 of the plurality of raised rib-like elements 304a. In one or more embodiments, the billows 500a, 500b are formed because the strain causes delamination or separation of the first and second films 402, 404 in areas including the first pattern 312. The resulting billow pocket for capturing liquids 502 formed by the billows 500a, 500b effectively contains liquid if either the first film 402 or the second file 404 is punctured in the area of the billow pockets for capturing liquids 502.

In one or more implementations, the degree of delamination that occurs in the areas of low-stretch (e.g., the areas including the first pattern 312) can be controlled by the concentration of rib-like elements relative to the undeformed land areas. In particular, the size and shape of the land areas can control the amount of delamination, and thus, the size and shape of the billows and resulting billow pockets for capturing liquids. In addition to the foregoing, the amount of deformation can also be controlled by resin formulation of the thermoplastic films, and/or tackifying adjuvants or surface constituents.

In some implementations, when objected to force or strain, billows may only form in one of the first film 402 or the second film of the multiple-ply thermoplastic film 200. For example, as shown in FIG. 4C, when strained, the first film 402 delaminates from the second film 404 and forms billows, such as billow 500a, in areas including the first pattern 312 of the plurality of raised rib-like elements 403a. As further illustrated in FIG. 4C, the second film 404 does not form billows under strain or tension (e.g., due to alternative thickness or film agents). Thus, the billow pocket for capturing liquids 502 forms in the delaminated area in-between the billow 500a and the corresponding flat area of the second film 404.

In some implementations, additional materials may be introduced in-between the first film 402 and the second film 404 such that, when formed, the billow pockets for capturing liquids have additional properties. For example, the thermoplastic film may be formed with a desiccant material, an absorbent material, and/or an antimicrobial material in-between the first film 402 and the second film 404. After stretching, the leak or billow pockets in the multiple-ply thermoplastic film can include the desiccant material, the absorbent material, and/or the antimicrobial material. Thus, when such a billow pocket for capturing liquids is punctured, the billow pocket for capturing liquids may capture fluid which is then dried, absorbed, and/or sanitized by the material therein.

Additionally, in some implementations, one or more of the first film 402 and the second film 404 may be translucent such that any liquid trapped in one or more billow or billow pockets for capturing liquids is visible. Moreover, depending on the placement of the micro and macro patterns in the complex stretch pattern 220a, trapped liquid in one or more billow pockets may drain through the complex stretch pattern 220a toward the bottom of the multiple-ply thermoplastic film 200. This is especially advantageous when the multiple-ply thermoplastic film 200 is formed into a garbage bag and trapped liquid can visibly drain away from the opening of the garbage bag.

A comparison of FIG. 4A to FIGS. 4B and 4C illustrate another advantage of one or more implementations. In particular, as shown by FIG. 4A, the multi-ply film can have an initial flat configuration until strained. This can allow the multi-ply films and multi-ply bags to be packaged compactly for storage or shipping. When placed in use and upon application of a strain, the billows and resulting billow pockets for capturing liquids can form resulting in multi-ply films and multi-ply bags with greater loft.

Figure 5:
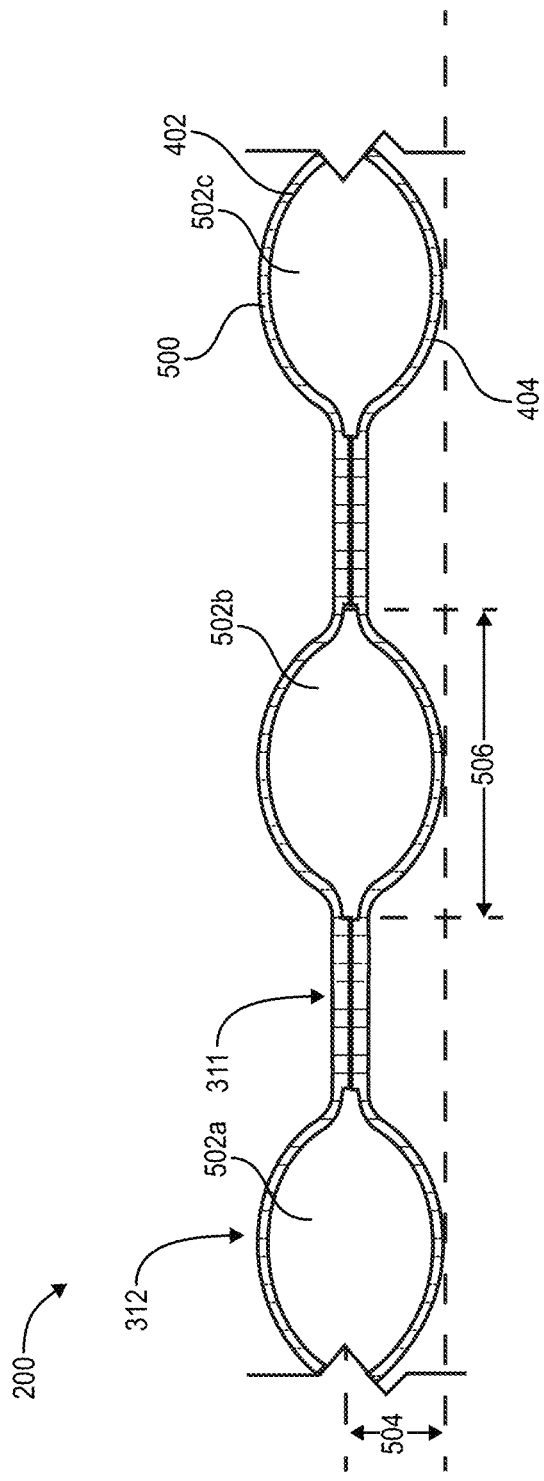
FIG. 5 shows a partial side cross-sectional view of the film of FIG. 4B illustrating billow pockets for capturing liquids according to one or more implementations of the present disclosure.

As used herein the term "billow" refers to the puckering of a thermoplastic film such that the thermoplastic film does not lie in a planar position. As shown by FIG. 5, the billows 500 can comprise a height 504 and a width 506. The height 504 is measured at the farthest point in the Z-direction from a base of the billow 500. In one or more embodiments, the billows 500 have one or more of average heights 504 greater than 3000 micrometers or average widths 506 greater than 3000 micrometers. More particularly, the billows 500 can be between 3000 and 16000 micrometers in width and between 3000 and 16000 micrometers in height. More particularly, the billows 500 can be between 4000 and 16000 micrometers in width and between 3000 and 8000 micrometers in height. The height of a corresponding billow pocket for capturing liquids 502a, 502b, 502c can be the combined height of the two billows forming the billow pocket for capturing liquids. In other implementations, the billow pockets for capturing liquids 502a-502c may have a height that is less than twice the height 504 of the billows 500 (e.g., such as illustrated in FIG. 4C).

Moreover, as shown in FIG. 5, when the multiple-ply thermoplastic film 200 includes the first film 402 and the second film 404, the delamination and billows between the films 402 and 404 create the billow pockets for capturing liquids 502a, 502b, and 502c. In one or more implementations, the billow pockets for capturing liquids 502a-502c have a width that is equal to the width 506 of the billows 500.

In one or more embodiments, the height of the billows is directly proportional to a dimension (e.g., length and width) of the macro pattern of the film (e.g., the macro pattern 312 of FIG. 3). For example, the height of the billows can be approximately 0.10 to 0.25 times the length or the width of the macro pattern. In particular, the height of the billows can be approximately 0.15 to 0.20 times the length or the width of the macro pattern. Alternatively, the height of the billows can be approximately ⅛ to ⅕ a distance equal to the length plus the width of the macro pattern. In particular, the height of the billows can be approximately ¹⁄₁₀ to ¹⁄₁₂ a distance equal to the length plus the width of the macro pattern. As a non-limiting example, the billow height of a macro portion of film with a size of 0.6 inches×0.63 inches is 0.125 inches tall. In further embodiments, larger rectangles of film including macro patterns can have even taller billow heights. For example, the billow height of a macro portion of film with a size of 1.2×1.26 inches is 0.25 inches tall.

In some implementations, the height 504 is within a range of about 2800 μm to about 3600 μm. In additional implementations, the height 504 is within a range of about 3000 μm to about 3400 μm. In yet further implementations, the height 504 is about 3200 μm. In some instances, the width 506 may be within the range of about 8000 μm to about 14500 μm. In additional implementations, the width 506 may be within the range of about 8400 μm to about 14000 μm.

As noted above, the billows and resulting can increase a height of the multi-ply film or, in other words, provide the multi-ply film with loft. For example, an activated film with complex stretch pattern (SELF'ed and then strained film) with billow pockets for capturing liquids can have height that is 100 to 350 times the original combined gauge of the two plies of film (i.e., gauges prior to passing through the SELF'ing rollers). In one or more embodiments, an activated multi-ply film with complex stretch pattern with billow pockets for capturing liquids can have a height that is 125 to 350 times the original combined gauges of the plies of film, a height that is 150 to 250 times the original combined gauges of the plies of film, a height that is 175 to 250 times the original combined gauges of the plies of film, a height that is 200 to 250 times the original combined gauges of the plies of film, or a height that is 225 to 250 times the original combined gauges of the plies of film.

The original rib-like elements of one or more embodiments of a multi-ply film with a complex stretch pattern can comprise a height of about 1.50 millimeters to about 3.00 millimeters. Thus, upon activation a loft or height of a multi-ply film with billow pockets for capturing liquids can have a height that is 1.2 to 15.0 times the original combined gauges of the plies of film, a height that is 1.5 to 12.0 times the original combined gauges of the plies of film, a height that is 2.6 to 10.6 times the original combined gauges of the plies of film, a height that is 5.3 to 10.6 times the original combined gauges of the plies of film, or a height that is 5 to 7.5 times the original combined gauges of the plies of film.

Furthermore, implementations of the present invention allow for tailoring (e.g., increasing) of the loft of a film independent of the basis weight (amount of raw material) of the film. Thus, one or more implementations can provide films with increased loft despite a reduction in thermoplastic material. As such, one or more implementations can reduce the material needed to produce a product while maintaining or increasing the loft of the film.

Figure 6A:
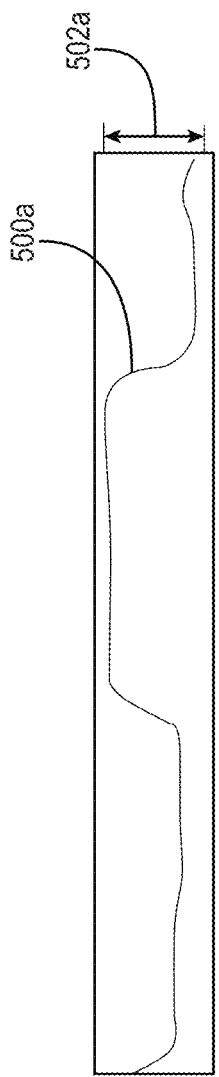
FIG. 6A illustrates a profile, taken from a micro-photograph, of a film with a complex stretch pattern after having been subjected to an applied, and subsequently released, strain according to one or more implementations of the present disclosure.
Figure 6B:
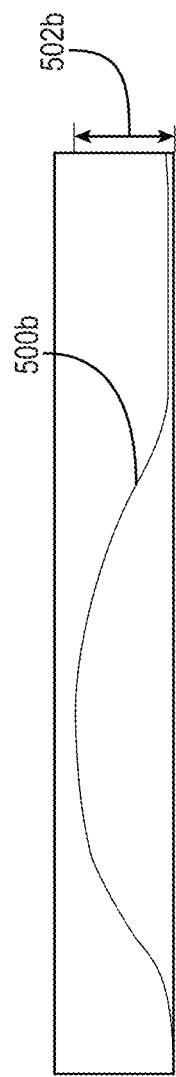
FIG. 6B illustrates a profile, taken from a micro-photograph, of another film with a complex stretch pattern after having been subjected to an applied, and subsequently released, strain according to one or more implementations of the present disclosure.
Figure 6C:
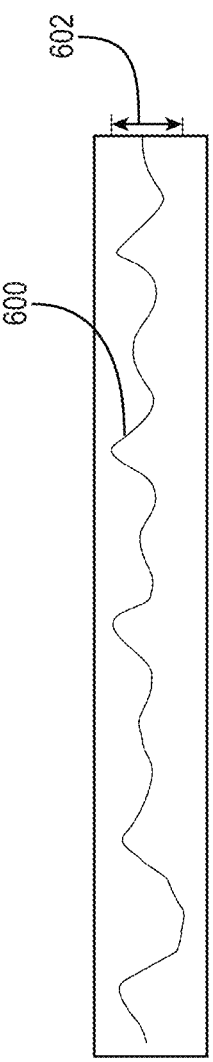
FIG. 6C illustrates a profile, taken from a micro-photograph, of a prior-art SELF'ed film after having been subjected to an applied, and subsequently released, strain according to one or more implementations of the present disclosure.

While FIG. 5 illustrates a conceptual view of the billows 500 and the billow pockets for capturing liquids 502a-502c, FIGS. 6A and 6B illustrate actual cross-sections of halves of billow pockets for capturing liquids 502a, 502b of thermoplastic films with complex stretch patterns. FIG. 6C on the other hand shows a cross-section of a conventionally SELF'ed film with conventional billows 600. In particular, FIG. 6C shows a cross-section of a conventionally SELF'ed film with rib-like elements in a diamond patterns as described in U.S. Pat. No. 5,650,214. As shown, thermoplastic films with complex stretch patterns can have billow pockets for capturing liquids 502a, 502b that have heights 504a, 504b that are between 2.4 and 7 times the height 602 of billows 600 of conventionally SELF'ed films. Similarly, as shown, thermoplastic films with complex stretch patterns can have billow pockets for capturing liquids 502a, 502b that have widths that are between 2 and 6 times the width of billows 600 of conventionally SELF'ed films.

Figures 7, 8:
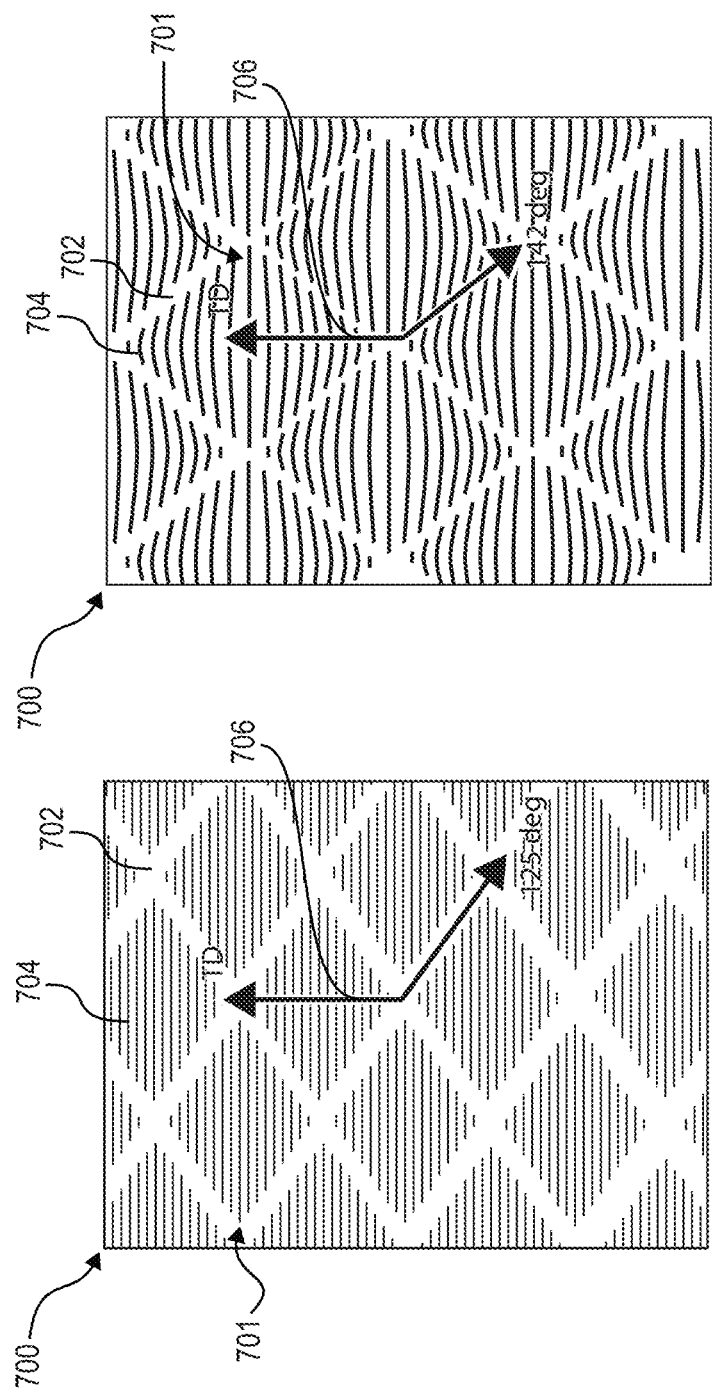
FIG. 7 shows a front view of a prior art film having a stretch pattern in a "Diamond" shape with land areas oriented non-parallel to the direction of applied force according to one or more implementations of the present disclosure.
FIG. 8 shows a front view of the film of FIG. 7 after having been subjected to an applied, and subsequently released, strain according to one or more implementations of the present disclosure.

FIGS. 7 and 8 illustrate a prior art pattern that offers greater extension than the complex stretch patterns of the present disclosure. For example, the thermoplastic film 700 in FIG. 7 includes a conventional stretch pattern 701 (e.g., a diamond pattern). As shown in FIG. 7, the stretch pattern 701 includes a plurality of isolated deformed, raised, rib-like elements 704 (e.g., forming "diamonds") separated by a land area 702. In at least one embodiment, the stretch pattern 701 features an approximately 78.4% proportion by area of ribs per repeat unit.

The stretch pattern 701 has a higher extension equal to 0.16 inches or more per repeat unit when subjected to a tensile stress between 150 and 200 psi. For example, as shown in FIG. 7, prior to the application of stress in the transverse direction, the land area 702 is oriented approximately 125 degrees from the transverse direction 706 (e.g., indicated by the illustrative arrow). After application of stress in the transverse direction, as shown in FIG. 8, this angle increases to approximately 142 degrees. In other words, as stress is applied to the thermoplastic film 700 with the stretch pattern 701, the land areas 702 rotate along their length to approach the direction of the applied stress resulting in a higher measured linear deformation. In at least one embodiment, this rotation is even greater with a higher degree of applied stress.

In one or more embodiments, the degree of rotation by high extension stretch patterns, such as the stretch pattern 701 is due, at least in part, to the orientation of the land areas 702. For example, the greater stretch of the stretch pattern 701 is because the stretch pattern 701 utilizes a land area 702 that fails to include any portions that are parallel with the direction of the applied stress (e.g., in the TD direction). As will be discussed in greater detail below, such parallel portions resist deformation and provide a low extension to a thermoplastic film, which allows for billowing and billow pockets for capturing liquids.

FIG. 9A is a top view of a portion of a thermoplastic film 200a with the complex stretch pattern 220a in a checkerboard configuration prior to being subjected to an applied load. As used herein, a "checkerboard pattern" refers to a complex stretch pattern comprising alternating squares. For example, a checkerboard pattern can comprise two types of squares, which each of the four sides of one type of square is positioned directly next to the opposite type of square. For example, the type of squares may include a macro and a micro pattern, such as illustrated in FIGS. 9A and 9B. Alternatively, a checkerboard pattern may include alternating squares that are patterned and un-patterned, such as illustrated in FIGS. 10A and 10B, discussed below.

FIG. 9B is a view of the portion of the multiple-ply thermoplastic film 200a with the complex stretch pattern 220a after having been strained (i.e., after having been subjected to an applied and subsequently released load). As shown, the raised rib-like elements 304a of the strained thermoplastic film 200a can be strained to a greater extent than the raised rib-like elements 304b. This can be due to the micro pattern 311a providing a greater resistance to stretching than the macro pattern 312a and/or the particular arrangement of the web or land areas 302b between the raised rib-like elements 304b (e.g., as shown in the enlarged portion of the micro pattern 311a). Furthermore, the larger strain of the raised rib-like elements 304a of the macro pattern 312a can result in the billows and billow pockets for capturing liquids as described above. Thus, as shown in FIG. 9B, the areas of the film comprising the macro pattern 312a can billow to form billow pockets for capturing liquids.

Additionally, as shown in FIGS. 9A and 9B, the complex stretch pattern 220a includes land areas 302b (e.g., vertical columns of land areas indicated by the brackets 302b in the enlarged portion of the micro pattern 311a) between the rib-like elements 304b. In one or more embodiments, these land areas 302b enable the complex stretch pattern 220a to billow when stretched and released. In at least one embodiment, this is because of the nature of the visual deformation that occurs during application of stress. Accordingly, a film with the complex stretch pattern 220a including the land areas 302b feels stronger because it yields less at a given application of tensile stress, yet still includes areas that billow to create billow pockets for capturing liquids.

A factor that influences measured extension and visible deformation and billowing that creates the billow pockets for capturing liquids is the shape of the complex stretch pattern 220a respective to the direction of tensile stress (e.g., the transverse direction or TD). Typically, in the case of a drawstring trash bag, the film is SELF'ed such that the direction of tensile stress applied by a user during lifting is in the film's transverse direction. Therefore, a complex stretch pattern that has limited TD extension yet provides the perception of stretch will have portions of the pattern that deform through expansion in the TD direction while other portions resist linear deformation. Thus, in order to create other portions that resist linear deformation, the pattern will also include portions that are void of machine direction (MD) rib elements so that no thinning occurs in those areas during SELF'ing (e.g., land areas).

In one or more embodiments, when the length of land areas on a film are oriented parallel to the direction of an applied tensile stress (e.g., in the TD direction), the land areas will resist deformation. In at least one embodiment, this resistance is because the film is not thinned in the land areas, and as such these land areas offer greater yield strength relative to the thinned areas (e.g., the raised rib-like elements 304a). Conversely, when a film includes land areas that are oriented such that they are not parallel to the direction of an applied stress (e.g., as with the land areas 702 shown in FIGS. 7 and 8), the land area can rotate along its length so that it is pulled parallel to the direction of the stress. This non-parallel land area is not yielding so much as it is rotating to effectively lengthen the amount of overall film deformation in the direction of the stress.

Thus, as shown in FIGS. 9A and 9B, the multiple-ply thermoplastic film 200a features a complex stretch pattern 220a including 1) deformable areas that provide visible expansion upon stress (e.g., the first pattern 312a) to billow and create billow pockets for capturing liquids, and 2) land areas (e.g., the land areas 302b) that resist deformation by including a length dimension oriented in the direction of applied stress (e.g., the TD direction). For example, as shown in FIG. 9B, under applied stress in the TD direction, the land areas 302b remain oriented parallel to the TD direction. This is unlike non-parallel land areas 702, shown in FIG. 8, which rotate in the direction of the applied stress.

In the embodiment shown in FIGS. 9A and 9B, the repeat unit that makes the complex stretch pattern 220a includes 76.5% MD rib-like elements. Of those rib-like elements, 50% are continuous rib-like elements (e.g., as in the first pattern 310a), which constitute the deformable area that billow to produce billow pockets for capturing liquids that provide visible expansion upon TD tensile stress. The remaining 26.5% of the MD rib-like elements are shorter non-continuous structures (e.g., as in the second pattern 311a). As further shown in FIGS. 9A and 9B, repeat unit that makes the complex stretch pattern 220a also includes 23.5% non-thinned land areas (e.g., the land areas 302b), all of which are oriented with lengths parallel to the TD axis. In at least one embodiment, these land areas 302b resist deformation.

In addition to the foregoing, FIGS. 9A and 9B illustrate that the land areas 302b, in one or more embodiments, are non-continuous across the film. In other words, the land areas are intersected by rib-like elements such that the land areas do not form a continuous path across the film. In alternative embodiments, the land areas can be continuous across the film.

FIGS. 10A and 10B illustrate another embodiment of a film 200a including a pattern of raised rib-like elements and land areas that lead to the creation of billow pockets for capturing liquids. For example, as shown in FIG. 10A, the multiple-ply thermoplastic film 200a includes a checker board pattern with blocks including the macro pattern 312a of raised rib-like elements 304a, and blocks of land areas 302e. Unlike the embodiment illustrated in FIGS. 9A and 9B, the land areas 302e illustrated in FIGS. 10A and 10B are discontinuous. Although similar to the land areas 302b in FIG. 9A, the land areas 302e are completely oriented in the TD direction. Thus, the land areas 302b of the multiple-ply thermoplastic film 200a in FIGS. 9A and 9B helps allow the areas 312a to billow and create billow pockets for capturing liquids as shown in FIG. 10B and described above.

As mentioned above, the complex stretch patterns described above can provide a thermoplastic multi-ply film with billow pockets for capturing liquids. In particular, one or more implementations include sizing and positioning the plurality of raised rib-like elements and the plurality of web areas such that, when subjected to an applied load, portions of the multi-ply film billows to create billow pockets for capturing liquids.

Figure 11A:
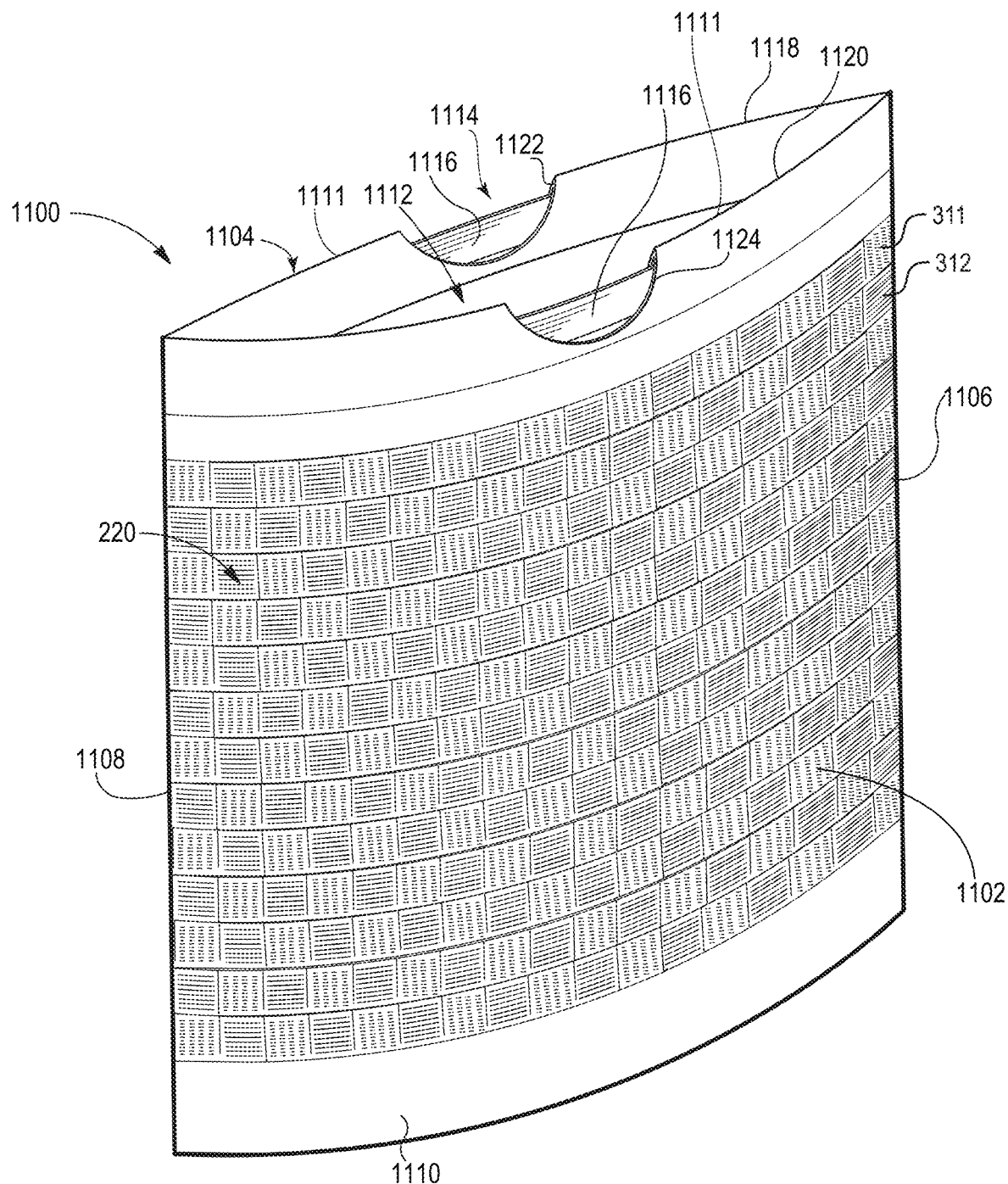
FIG. 11A shows a perspective view of a bag having a complex stretch pattern according to one or more implementations of the present disclosure.

As mentioned above, one or more implementations of the present disclosure include products made from or with such thermoplastic films with billow pockets for capturing liquids. For example, such products include, but are not limited to, grocery bags, trash bags, sacks, and packaging materials, feminine hygiene products, baby diapers, adult incontinence products, or other products. The remaining figures describe various bags including billow pockets for capturing liquids and methods of making the same. For example, FIG. 11A is a perspective view of a thermoplastic bag 1100 with billow pockets for capturing liquids 220 according to an implementation of the present disclosure. The thermoplastic bag 1100 with billow pockets for capturing liquids includes a first sidewall 1102 and a second sidewall 1104. Each of the first and second sidewalls 1102, 1104 includes a first side edge 1106, a second opposite side edge 1108, a bottom edge 1110 extending between the first and second side edges 1106, 1108, and top edge 1111 extending between the first and second side edges 1106, 1108 opposite the bottom edge. In some implementations, the first sidewall 1102 and the second sidewall 1104 are joined together along the first side edges 1106, the second opposite side edges 1108, and the bottom edges 1110. The first and second sidewalls 1102, 1104 may be joined along the first and second side edges 1106, 1108 and bottom edges 1110 by any suitable process such as, for example, a heat seal. In alternative implementations, the first and second sidewalls 1102, 1104 may not be joined along the side edges. Rather, the first and second sidewalls 1102, 1104 may be a single uniform piece. In other words, the first and second sidewalls 1102, 1104 may form a sleeve or a balloon structure.

In some implementations, the bottom edge 1110 or one or more of the side edges 1106, 1108 can comprise a fold. In other words, the first and second sidewalls 1102, 1104 may comprise a single unitary piece of material. The top edges 1111 of the first and second sidewalls 1102, 1104 may define an opening 1112 to an interior of the thermoplastic bag 1100 with billow pockets for capturing liquids. In other words, the opening 1112 may be oriented opposite the bottom edge 1110 of the thermoplastic bag 1100 with billow pockets for capturing liquids. Furthermore, when placed in a trash receptacle, the top edges 1111 of the first and second sidewalls 1102, 1104 may be folded over the rim of the receptacle.

In some implementations, the thermoplastic bag 1100 with billow pockets for capturing liquids may optionally include a closure mechanism 1114 located adjacent to the top edges 1111 for sealing the top of the thermoplastic bag 1100 with billow pockets for capturing liquids to form an at least substantially fully-enclosed container or vessel. As shown in FIG. 11A, in some implementations, the closure mechanism 1114 comprises a draw tape 1116, a first hem 1118, and a second hem 1120. In particular, the first top edge 1111 of the first sidewall 1102 may be folded back into the interior volume and may be attached to an interior surface of the first sidewall 1102 to form the first hem 1118. Similarly, the second top edge 1111 of the second sidewall 1104 is folded back into the interior volume and may be attached to an interior surface of the second sidewall 1104 to form a second hem 1120. The draw tape 1116 extends through the first and second hems 1118, 1120 along the first and second top edges 1111. The first hem 1118 includes a first aperture 1122 (e.g., notch) extending through the first hem 1118 and exposing a portion of the draw tape 1116. Similarly, the second hem 1120 includes a second aperture 1124 extending through the second hem 1120 and exposing another portion of the draw tape 1116. During use, pulling the draw tape 1116 through the first and second apertures 1122, 1124 will cause the first and second top edge 1111 to constrict. As a result, pulling the draw tape 1116 through the first and second apertures 1122, 1124 will cause the opening 1112 of the thermoplastic bag with billow pockets for capturing liquids to at least partially close or reduce in size. The draw tape closure mechanism 1114 may be used with any of the implementations of a reinforced thermoplastic bag described herein.

Although the thermoplastic bag 1100 with billow pockets for capturing liquids is described herein as including a draw tape closure mechanism 1114, one of ordinary skill in the art will readily recognize that other closure mechanisms 1114 may be implemented into the thermoplastic bag 1100 with billow pockets for capturing liquids. For example, in some implementations, the closure mechanism 1114 may include one or more of flaps, adhesive tapes, a tuck and fold closure, an interlocking closure, a slider closure, a zipper closure, or any other closure structures known to those skilled in the art for closing a bag.

As shown in FIG. 11A, the thermoplastic bag 1100 may include a complex pattern 220 formed in one or more of the first sidewall 1102 and the second sidewall 1104 that forms billow pockets for capturing liquids when strained. For example, as is discussed below, the complex stretch pattern may be formed in the first sidewall 1102 and/or the second sidewall 1104 via one or more of SELF'ing rollers or micro-SELF'ing rollers. The plurality of raised rib-like elements and the plurality of web areas of the complex stretch pattern 220 are sized and positioned such that: the thermoplastic bag 1100 when subjected to an applied and subsequently released load, billows and corresponding billow pockets for capturing liquids are formed in the thermoplastic bag 1100.

Moreover, as discussed above, the complex stretch pattern 220 may include a micro pattern 311 and a macro pattern 312 that can imbue the thermoplastic bag 1100 with additional characteristics. For example, when the thermoplastic bag 1100 includes multiple-ply sidewalls 1102, 1104, the areas featuring the macro pattern 312 can delaminate and billow after being stretched. To illustrate, when force is applied to the thermoplastic bag 1100 in the TD direction (e.g., such as when the draw tape 1116 is gathered and the thermoplastic bag 1100 is lifted out of a garbage can), the areas featuring the macro pattern 312 can delaminate and billow forming billow pockets for capturing liquids throughout the sidewalls 1102, 1104 of the thermoplastic bag 1100. Should the inner ply of one of the sidewalls 1102, 1104 be punctured in an area of the macro pattern 312, the billow pocket for capturing liquids in the same area can capture any liquid that may leak out of garbage within the thermoplastic bag 1100.

Figure 11B:
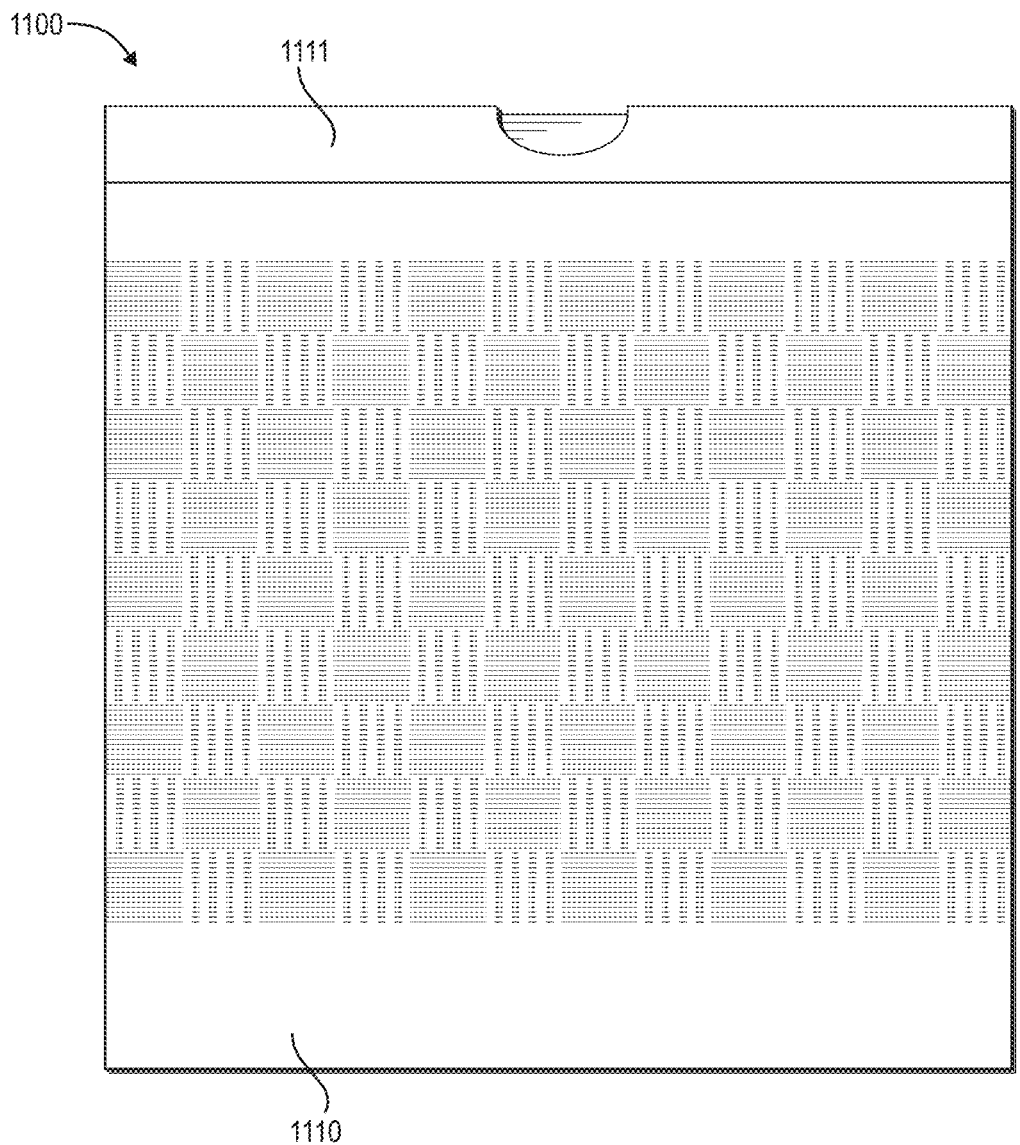
FIG. 11B shows a front view of the bag of FIG. 11A according to one or more implementations of the present disclosure.
Figure 11C:
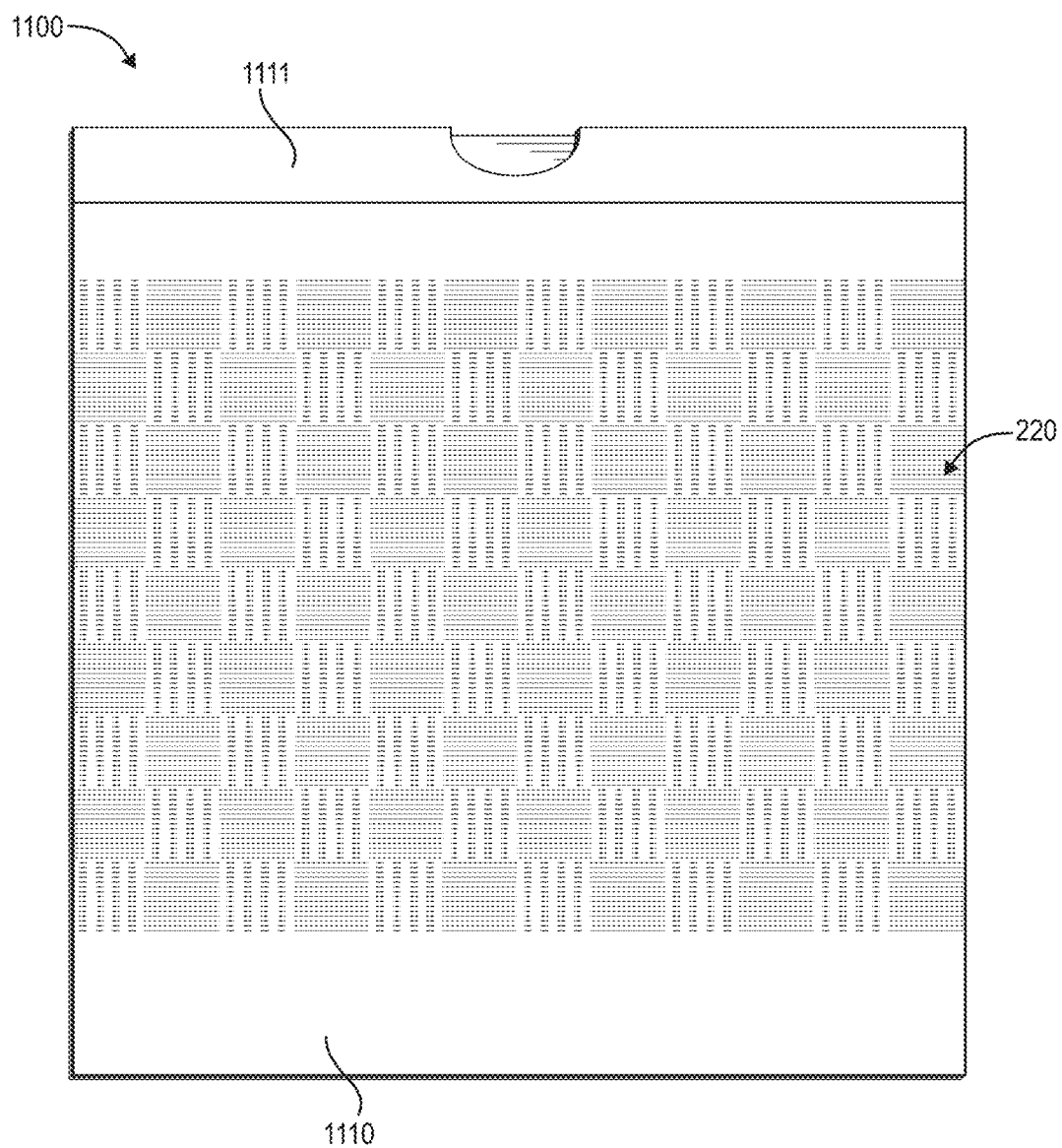
FIG. 11C shows a back view of the bag of FIG. 11A according to one or more implementations of the present disclosure.

FIG. 11B illustrates a front view of the thermoplastic bag 1100 shown in FIG. 11A. As shown in FIG. 11B, the thermoplastic bag 1100 includes the complex stretch pattern 220 spaced between the top edge 1111 and the bottom edge 1110 of the thermoplastic bag 1100. FIG. 11C illustrates a back view of the thermoplastic bag 1100 shown in FIG. 11A. As shown in FIG. 11C, in at least one implementation, the back of the thermoplastic bag 1100 includes the complex stretch pattern 220 at the same distance from the top edge 1111 and the bottom edge 1110 as in the front of the thermoplastic bag 1100 (e.g., as shown in FIG. 11B).

Figures 11D, 11E:
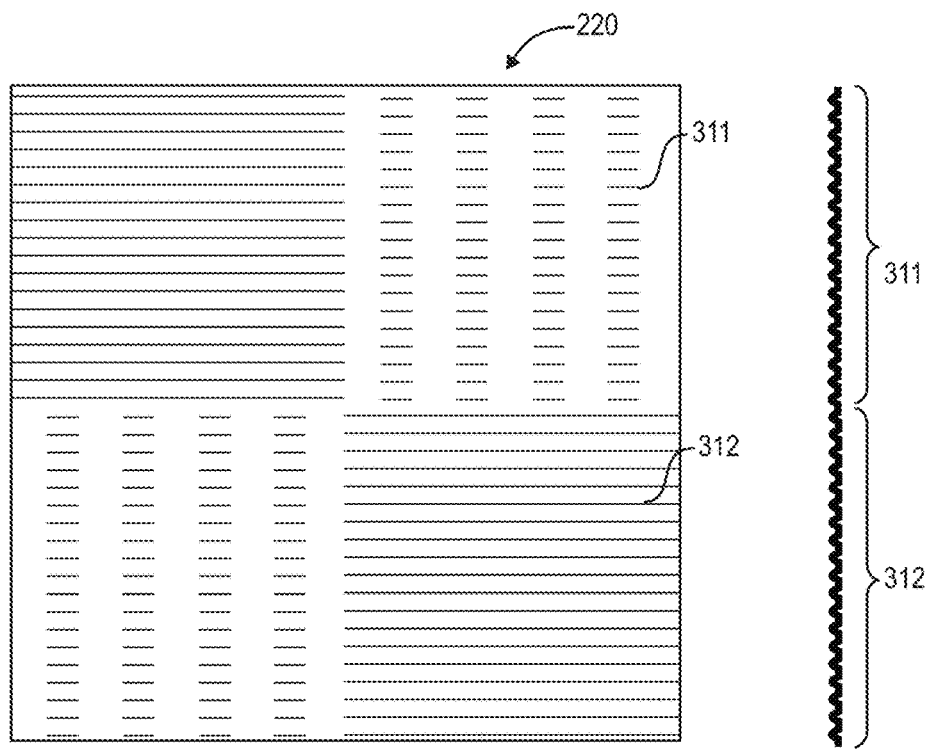
FIG. 11D shows an enlarged partial view of the complex stretch pattern of FIG. 11A in an unstretched configuration according to one or more implementations of the present disclosure.
FIG. 11E shows partial side cross-sectional view of the complex stretch pattern of FIG. 11A in an unstretched configuration according to one or more implementations of the present disclosure.

FIG. 11D illustrates an enlarged partial view of the complex stretch pattern 220 prior to being subjected to stretching in the TD direction. As shown in FIG. 11D, the complex stretch pattern 220 includes the first pattern 310 of raised rib-like elements, and the second pattern 312 of raised rib-like elements with land areas parallel to the TD direction. FIG. 11E illustrates a partial side cross-sectional view of the complex stretch pattern 220 prior to being subjected to stretching in the TD direction. As shown in FIG. 11E, prior to stretching, the raised rib-like elements of the first pattern 310 and the second pattern 312 have the same height.

Figures 11F, 11G:
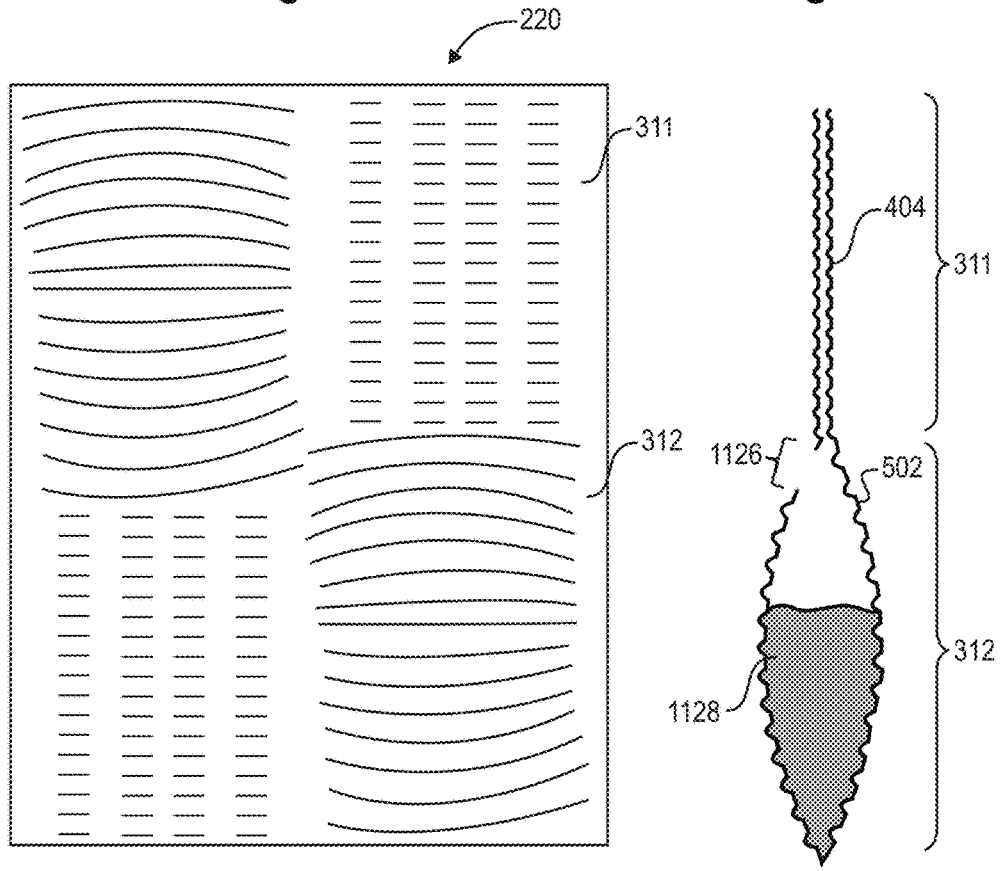
FIG. 11F shows an enlarged partial view of the complex stretch pattern of FIG. 11A in a stretched configuration with created billow pockets for capturing liquids according to one or more implementations of the present disclosure.
FIG. 11G shows a partial side cross-sectional view of the complex stretch pattern of FIG. 11A in a stretched configuration including a billow pocket for capturing liquids according to one or more implementations of the present disclosure.

FIG. 11F illustrates an enlarged partial view of the complex stretch pattern 220 after being subjected to stretching in the TD direction, which creates billowing and billow pockets for capturing liquids. As shown in FIG. 11F, after stretching, the raised rib-like elements of the first pattern 312 become distended and billow. Conversely, after stretching, the raised rib-like elements of the second pattern 311 resist deformation due to the land areas that are parallel to the TD direction. FIG. 11G illustrates a partial side cross-sectional view of the complex stretch pattern 220 after being subjected to stretching in the TD direction. As shown in FIG. 11G, after stretching, the raised rib-like elements of the first pattern 312 flatten and create a stretched region that billows to a greater height than the raised rib-like elements of the second pattern 311.

The stretching and billowing in the areas of the first pattern 312 cause delamination or separation of the first layer 402 and the second layer 404 resulting in a billow pocket for capturing liquids 502 (or billow pocket). When a puncture 1126 (e.g., a tear or separation in the first layer 402 of the multiple-ply film) is introduced in an area including the billow pocket for capturing liquids 502, liquid 1128 can be trapped in the billow pocket for capturing liquids 502. If a second puncture (not shown) is introduced in the second layer 404 the area including the billow pocket for capturing liquids 502, the liquid 1128 may still be effectively trapped in the billow pocket for capturing liquids 502, depending on the positioning of the second puncture. In other words, the billow pocket for capturing liquids 502 may still be effective for containing liquid even when both layers of film in the area of the billow pocket for capturing liquids 502 are punctured. The raised rib-like elements of the second pattern 311 remain largely unchanged.

Figure 12:
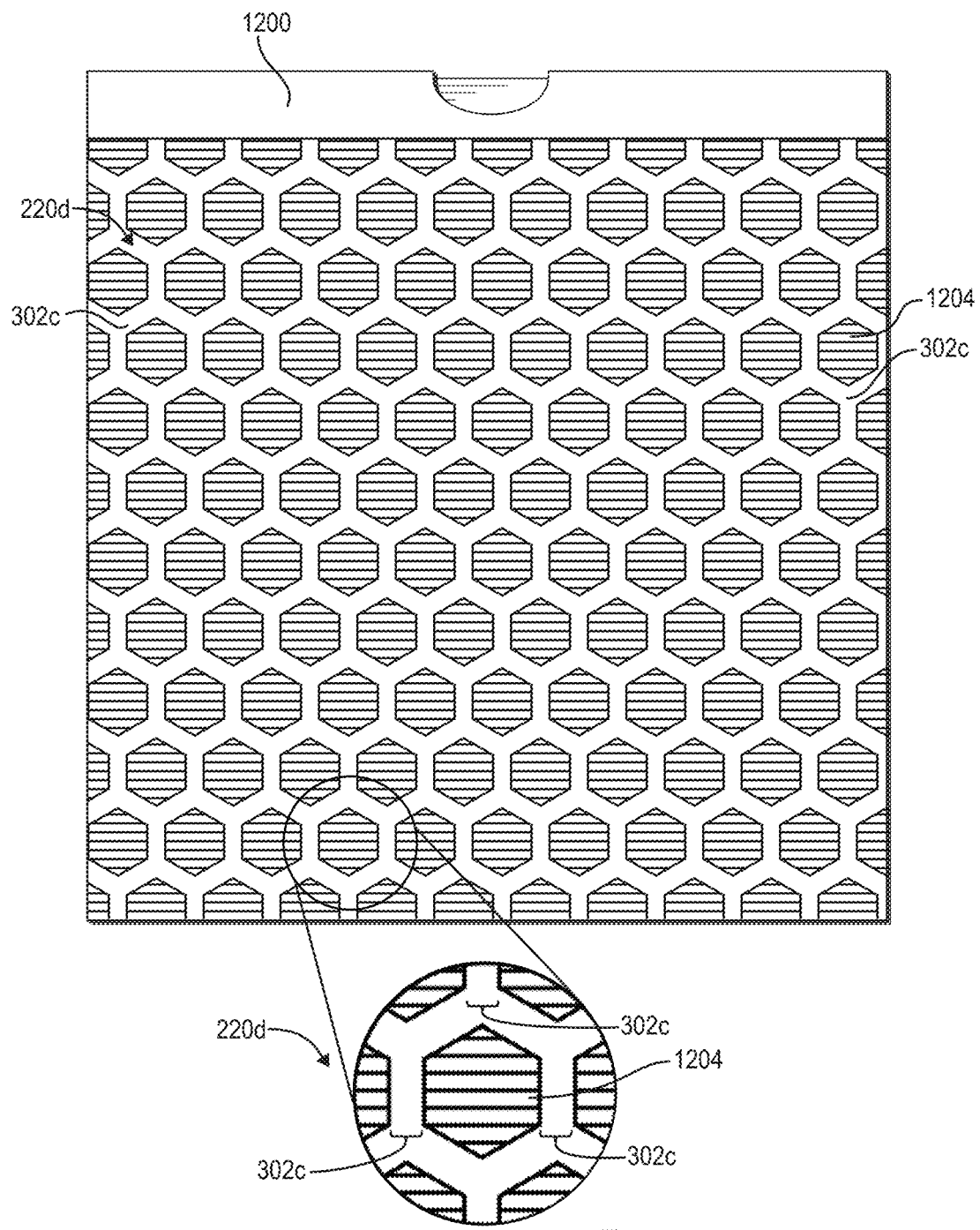
FIG. 12 is a front side view of a bag with a complex stretch pattern in the form of hexagons according to an implementation of the present disclosure.

FIG. 12 illustrates yet another thermoplastic bag 1200 with sidewalls including a complex pattern 220d formed therein (e.g., illustrated in the enlarged detail) that produces billow pockets for capturing liquids when strained. The thermoplastic bag 1200 can include the same structure as the thermoplastic bag 1100 albeit with a different complex stretch pattern. In particular, the thermoplastic bag 1200 may include a plurality of raised rib-like elements 1204 in a hexagon pattern. As shown, the raised rib-like elements 1204 are surrounded by the land areas 302c. The plurality of raised rib-like elements and the plurality of land areas of the complex stretch pattern 220d are sized and positioned such that: the thermoplastic bag 1200 when subjected to an applied and subsequently released load, the hexagon areas billow to produce billow pockets for capturing liquids.

As further shown in FIG. 12, the complex stretch pattern 220d includes land areas 302c with portions (e.g., indicated by the brackets in the enlargement) that are parallel to the direction of applied force (e.g., the TD direction), and portions that are non-parallel to the direction of applied force. For example, in the use case where a consumer pulls the thermoplastic bag 1200 up by the draw tape, the direction of applied force is in the same direction that the consumer is pulling (e.g., substantially vertical). Thus, the parallel portions of the land areas 302c are those that have lengths perpendicular to the top and bottom of the thermoplastic bag 1200. It follows that the non-parallel portions of the land areas 302c are those that have lengths that extend in non-perpendicular directions (e.g., with angles other than 180 degrees from vertical) from the top and bottom of the thermoplastic bag 1200.

In one or more embodiments, the thermoplastic bag 1200 (e.g., and the thermoplastic film making up the thermoplastic bag 1200) can exhibit lead to the creation of billow pockets for capturing liquids, even when only a portion of the land areas 302c is oriented parallel to the direction of applied force. As discussed above with reference to FIGS. 9A and 9B, the most illustrative case of this invention is a film with one hundred percent of the included land areas being parallel to the direction of applied force (e.g., the TD direction). In alternative or additional embodiments, a film can still exhibit advantageous creation of billow pockets for capturing liquids when only a percentage of the land area is oriented parallel to the direction of applied force. For example, in some embodiments, complex stretch patterns may lead to the creation of billow pockets for capturing liquids when at least fifty percent of included land areas are parallel to the TD direction. Similarly, complex stretch patterns may lead to the creation of billow pockets for capturing liquids when another percentage less than one hundred percent (e.g., at least eighty percent) of included land areas are parallel to the TD direction.

As discussed above, when subjected to force in the TD direction, areas of the complex stretch pattern 220d can further billow and cause delamination between layers in the sidewalls of the thermoplastic bag 1200. For example, in at least one implementation, when used in connection with multiple-ply sidewalls, the plurality of raised rib-like elements 1204 in the complex stretch pattern 220d can billow and cause delamination between the layers of the multiple-ply sidewalls, which in-turn form billow pockets for capturing liquids (e.g., hexagonal billow pockets for capturing liquids). The layers of the multiple-ply sidewalls in the areas including the land areas 302c can remain laminated and relatively unchanged.

Figure 13:
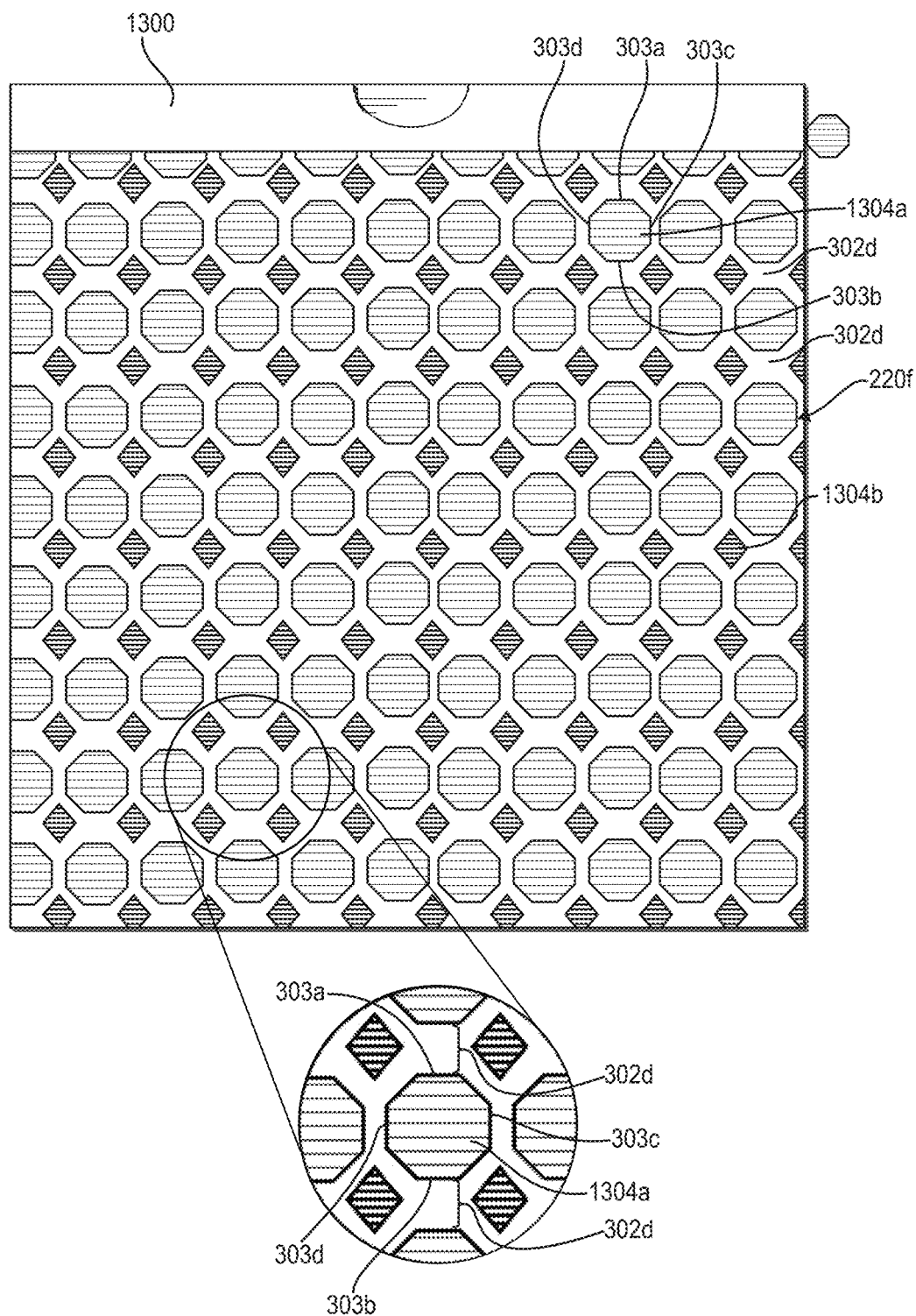
FIG. 13 is a front side view of a bag with a complex stretch pattern in the form of hexagons and diamonds according to an implementation of the present disclosure.

FIG. 13 illustrates a thermoplastic bag 1300 with sidewalls including a complex pattern 220f (e.g., illustrated in the enlarged detail) formed therein that produces billow pockets for capturing liquids when strained. In particular, the complex stretch pattern 220f can comprise raised rib-like elements 1304a in octagon patterns, raised rib-like elements 1304b in diamond patterns, and land areas 302d positioned between and surrounding the octagon and diamond patterns. The plurality of raised rib-like elements and the plurality of web areas of the complex stretch pattern 220f are sized and positioned such that: the thermoplastic bag 1300 when subjected to an applied and subsequently released load, areas billow to produce billow pockets for capturing liquids.

As discussed above, when the thermoplastic bag 1300 includes multiple-ply sidewalls, the raised rib-like elements 1304a in octagon patterns and/or the raised rib-like elements 1304b in diamond patterns can billow and cause delamination between the layers of the sidewalls, which in-turn form billow pockets for capturing liquids (e.g., octagonal billow pockets for capturing liquids and/or diamond billow pockets for capturing liquids). The layers of the multiple-ply sidewalls in the areas including the land areas 302c can remain laminated and relatively unchanged.

As discussed above with reference to FIG. 12, the thermoplastic bag 1300 has a pattern of raised rib-like elements and land areas that leads to the creation of billow pockets for capturing liquids. For example, as shown in FIG. 13, the land areas 302d at the top 303a, bottom 303b, right side 303c and left side 303d of each area of rib-like elements 1304a in octagon patterns are oriented parallel with the TD direction. The remainder of the land areas 302d are oriented non-parallel with the TD direction. In one or more embodiments, the complex stretch pattern 220f will lead to the creation of billow pockets for capturing liquids as long as a threshold percentage or portion of the land areas 302d are oriented parallel with the direction of applied force (e.g., the TD direction).

Figure 14:
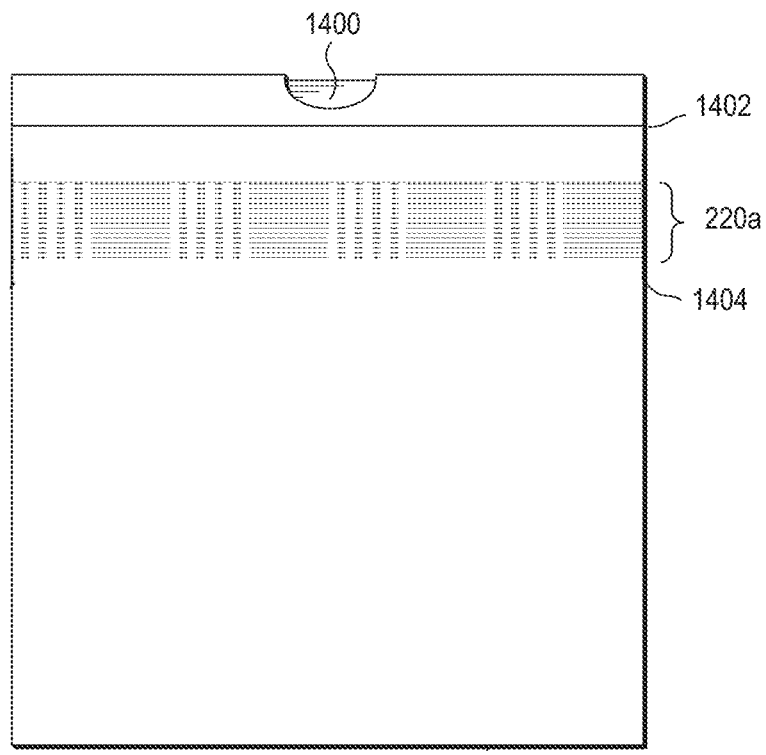
FIG. 14 is a front side view of a bag with a complex stretch pattern in a band cross the width of the bag but only a portion of the height of the bag according to an implementation of the present disclosure.

While the bags shown and described above include complex stretch patterns formed in the entire sidewalls of the bags, one will appreciate in light of the disclosure herein that the present invention is not so limited. In alternative embodiments, the bags can comprise complex stretch patterns in zones or areas so as to provide tailor stretch properties to different areas of the bag. For example, FIG. 14 illustrates a thermoplastic bag 1400 including a complex pattern 220a formed in a band proximate a hem 1402 of the bag 1400. Thus, as shown a bottom portion 1404 of the bag 1400 (i.e., each sidewall) is devoid of raised rib-like elements. In such implementations, billow pockets for capturing liquids will only form in the band proximate the hem 1402.

Figure 15:
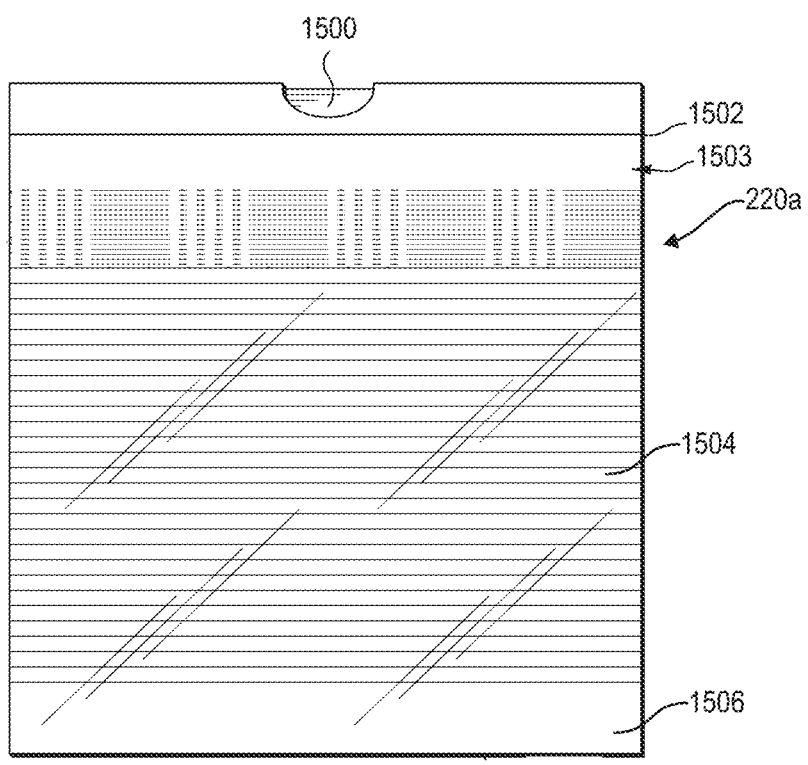
FIG. 15 is a front side view of another bag with a complex stretch pattern in a band cross the width of the bag but only a portion of the height of the bag according to an implementation of the present disclosure.

FIG. 15 illustrates another thermoplastic bag 1500 including a complex pattern 220a formed in a band proximate a hem 1502 of the bag 1500 that will produce billow pockets for capturing liquids when strained. Rather than a middle portion 1504 of the bag 1500 (i.e., each sidewall) being devoid of raised rib-like elements, the middle portion 1504 includes incrementally stretched ribs formed by ring rolling as described in U.S. Pat. No. 9,637,278, the entire contents of which are hereby incorporated by reference. The thermoplastic bag 1500 also includes an un-stretched bottom region 1506 that is devoid of raised rib-like elements and incremental stretching.

Figure 16:
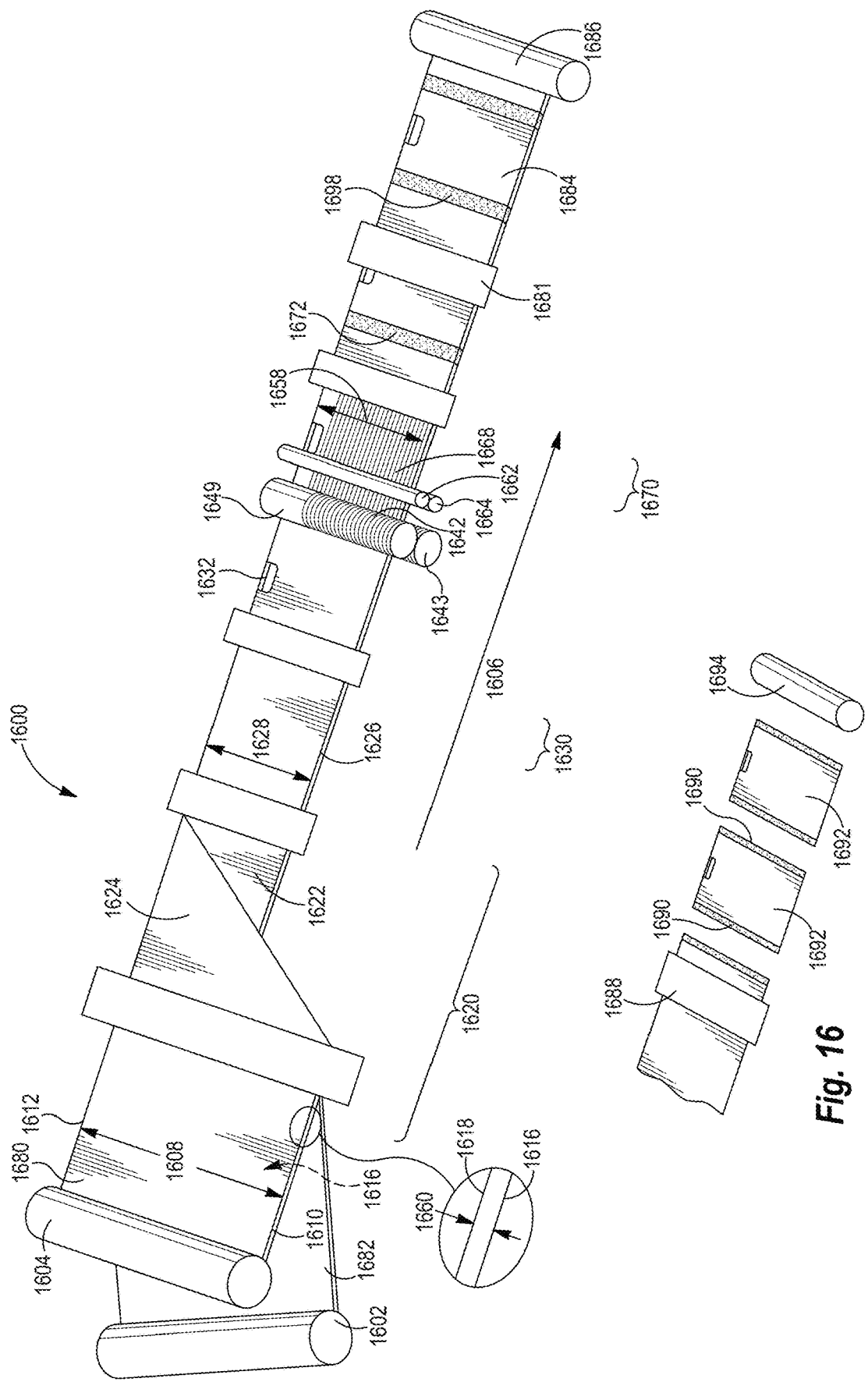
FIG. 16 illustrates a schematic diagram of a process for manufacturing multiple-ply bags with billow pockets for capturing liquids in accordance with one or more implementations of the present disclosure.

To produce a bag having billow pockets for capturing liquids as described, continuous webs of thermoplastic material may be processed through a high-speed manufacturing environment such as that illustrated in FIG. 16. In the illustrated process 1600, production may begin by unwinding a first continuous web or film 1680 of thermoplastic sheet material from a roll 1604, unwinding a second continuous web or film 1682 of thermoplastic sheet material from a roll 1602, and advancing both webs or films along a machine direction 1606. The unwound webs 1680, 1682 may have a width 1608 that may be perpendicular to the machine direction 1606, as measured between a first edge 1610 and an opposite second edge 1612 (and corresponding edges in the second film 1682). The unwound web 1680 may have an initial average thickness 1660 measured between a first surface 1616 and a second surface 1618. The unwound web 1682 may have a similar thickness. In other manufacturing environments, the webs 1680, 1682 may be provided in other forms or even extruded directly from a thermoplastic forming process. To provide the first and second sidewalls of the finished bag, the webs 1680, 1682 may be folded into a first half 1622 and an opposing second half 1624 about the machine direction 1606 by a folding operation 1620. When so folded, the first edge 1610 may be moved adjacent to the second edge 1612 of the web. Accordingly, the width of the webs 1680, 1682 proceeding in the machine direction 1606 after the folding operation 1620 may be a width 1628 that may be half the initial width 1608. As may be appreciated, the portion mid-width of the unwound webs 1680, 1682 may become the outer edge of the folded web. In any event, the hems may be formed along the adjacent first and second edges 1610, 1612 and a draw tape 1632 may be inserted during a hem and draw tape operation 1630.

To form a complex stretch pattern 1668 that will result in billow pockets for capturing liquids, the processing equipment may include SELF'ing intermeshing rollers 1642, 1643 such as those described herein above. Referring to FIG. 16, the folded webs 1680, 1682 may be advanced along the machine direction 1606 between the SELF'ing intermeshing rollers 1642, 1643, which may be set into rotation in opposite rotational directions to impart the resulting complex stretch pattern 1668. To facilitate patterning of the webs 1680, 1682 the first roller 1642 and second roller 1643 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the complex stretch pattern 1668 intermeshing rollers 1642, 1643 may be arranged so that they are co-extensive with or wider than the width 1608 of the folded web. In one or more implementations, the complex stretch pattern 1668 intermeshing rollers 1642, 1643 may extend from proximate the folded edge 1626 to the adjacent edges 1610, 1612. To avert imparting the complex stretch pattern 1668 onto the portion of the web that includes the draw tape 1632, the corresponding ends 1649 of the rollers 1642, 1643 may be smooth and without the ridges and grooves. Thus, the adjacent edges 1610, 1612 and the corresponding portion of the web proximate those edges that pass between the smooth ends 1649 of the rollers 1642, 1643 may not be imparted with the complex stretch pattern 1668.

More particularly, passing the thermoplastic films 1680, 1682 between a first intermeshing roller 1642 and a second intermeshing roller 1643, wherein at least one of the first intermeshing roller and the second intermeshing roller comprises a repeat unit of a plurality of ridges, a plurality of notches, and a plurality of grooves. The wherein the repeat unit causes creation of a complex stretch pattern in the thermoplastic film, the complex stretch pattern comprising a plurality of raised rib-like elements and a plurality of land areas positioned that extend in a first direction. The plurality of raised rib-like elements and the plurality of land areas are sized and positioned such that, when subjected to the applied force in the first direction, the thermoplastic film delaminates and billows to create billow pockets for capturing liquids.

The processing equipment may include pinch rollers 1662, 1664 to accommodate the width 1658 of the web 1680. To produce the finished bag, the processing equipment may further process the folded web with the complex stretch pattern. For example, to form the parallel side edges of the finished bag, the web may proceed through a sealing operation 1670 in which heat seals 1672 may be formed between the folded edge 1626 and the adjacent edges 1610, 1612. The heat seals may fuse together the adjacent halves 1622, 1624 of the folded web. The heat seals 1672 may be spaced apart along the folded web and in conjunction with the folded outer edge 1626 may define individual bags. The heat seals may be made with a heating device, such as, a heated knife.

A perforating operation 1681 may perforate the heat seals 1672 with a perforating device, such as, a perforating knife so that individual bags 1690 may be separated from the web. In one or more implementations, the webs may be folded one or more times before the folded webs may be directed through the perforating operation. The webs 1680, 1682 embodying the bags 1684 may be wound into a roll 1686 for packaging and distribution. For example, the roll 1686 may be placed in a box or a bag for sale to a customer.

In one or more implementations of the process, a cutting operation 1688 may replace the perforating operation 1681. The web is directed through a cutting operation 1688 which cuts the webs at location 1690 into individual bags 1692 prior to winding onto a roll 1694 for packaging and distribution. For example, the roll 1694 may be placed in a box or bag for sale to a customer. The bags may be interleaved prior to winding into the roll 1694. In one or more implementations, the web may be folded one or more times before the folded web is cut into individual bags. In one or more implementations, the bags 1692 may be positioned in a box or bag, and not onto the roll 1694.

The second film 1682 can comprise a thermoplastic material, a width, and/or a thickness that is similar or the same as the first film 1680. In alternative one or more implementations, one or more of the thermoplastic material, width, and/or thickness of the second film 1682 can differ from that of the first film 1680. The films 1680, 1682 can be folded together during the folding operation 1620 such that they pass through the SELF'ing intermeshing rollers 1642, 1643 together to form the complex stretch pattern and resulting multi-layered bags.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-ply thermoplastic film with one or more strainable networks formed by a structural elastic like process, the multi-ply thermoplastic film comprising:
   a laminate comprising a first thermoplastic film layer lightly-bonded to a second thermoplastic film layer;
   a plurality of raised rib-like elements formed in a plurality of billow areas of the first and second thermoplastic film layers; and
   a plurality of land areas positioned about the plurality of billow areas, wherein the plurality of land areas extend in a first direction, and
   wherein the plurality of billow areas and the plurality of land areas are sized and positioned such that, when subjected to an applied force in a direction parallel to the first direction, the first thermoplastic film layer and the second thermoplastic film layer delaminate between raised rib-like elements of the plurality of billow areas and billow to create billow pockets for capturing liquids while the first thermoplastic film layer and the second thermoplastic film layer remain laminated at the plurality of land areas.

2. The multi-ply thermoplastic film as recited in claim 1, wherein the billow pockets for capturing liquids are fluidly connected.

3. The multi-ply thermoplastic film of claim 1, further comprising one or more of a tackifying adjuvant or a surface constituent between the first and second thermoplastic film layers that at least partially bonds the first and second thermoplastic film layers together.

4. The multi-ply thermoplastic film of claim 1, wherein the first thermoplastic film layer is a different thickness than the second thermoplastic film layer.

5. The multi-ply thermoplastic film of claim 1, wherein:
   the plurality of raised rib-like elements comprise a first plurality of raised rib-like elements arranged in a first pattern and a second plurality of raised rib-like elements arranged in a second pattern; and
   the first pattern and the second pattern are separated by at least a portion of the plurality of land areas.

6. The multi-ply thermoplastic film of claim 5, wherein first pattern of raised rib-like elements, the second pattern of raised rib-like elements, and the plurality of land areas repeat across the first and second thermoplastic film layers.

7. The multi-ply thermoplastic film of claim 6, wherein the first pattern of raised rib-like elements, the second pattern of raised rib-like elements, and the plurality of land areas repeat to form a checkerboard pattern.

8. The multi-ply thermoplastic film of claim 5, wherein when subjected to the applied force in the direction parallel to the first direction, the first pattern of raised rib-like elements delaminate to create the billow pockets for capturing liquids while the second pattern of raised rib-like elements remained at least partially bonded.

9. The multi-ply thermoplastic film as recited in claim 1, wherein one or more of the first thermoplastic film layer or the second thermoplastic film layer is translucent such that liquid contained within the billow pockets for capturing liquids is visible through the first thermoplastic film layer or the second thermoplastic film layer.

10. A multi-layer thermoplastic bag comprising:
    a first sidewall and a second sidewall joined together along a first side edge, a second side edge, and a bottom edge; and
    an opening opposite the bottom edge;
    wherein each of the first sidewall and the second sidewall comprise:
      a laminate comprising a first thermoplastic film layer lightly-bonded to a second thermoplastic film layer,
      a plurality of raised rib-like elements formed in a plurality of billow areas of the first and second thermoplastic film layers, and
      a plurality of land areas positioned about the plurality of billow areas, the plurality of land areas extending in a first direction,
      wherein when the multi-layer thermoplastic bag is subjected to an applied force in a direction parallel to the first direction, the first thermoplastic film layer and the second thermoplastic film layer delaminate between raised rib-like elements of the plurality of billow areas and billow to create billow pockets for capturing liquids while the first thermoplastic film layer and the second thermoplastic film layer remain laminated at the plurality of land areas.

11. The multi-layer thermoplastic bag as recited in claim 10, wherein the plurality of raised rib-like elements comprise a first plurality of raised rib-like elements arranged in a macro pattern and a second plurality of raised rib-like elements arranged in a micro pattern.

12. The multi-layer thermoplastic bag as recited in claim 11, wherein the billow pockets for capturing liquids are created in areas of the multi-layer thermoplastic bag comprising the macro pattern of raised rib-like elements.

13. The multi-layer thermoplastic bag as recited in claim 11, wherein areas of the multi-layer thermoplastic bag comprising the micro pattern of raised rib-like elements lack billow pockets for capturing liquids.

14. The multi-layer thermoplastic bag as recited in claim 11, wherein the billow pockets for capturing liquids are fluidly connected such that when liquid is introduced into an upper billow pocket for capturing liquids the liquid travels to a lower billow pocket for capturing liquids.

15. The multi-layer thermoplastic bag of claim 10, wherein the plurality of raised rib-like elements are arranged in a repeating pattern and each unit of the repeating pattern is surrounded by areas lacking raised rib-like elements that form the plurality of land areas.

16. The multi-layer thermoplastic bag as recited in claim 15, wherein the repeating pattern of the plurality of raised rib-like elements and the plurality of land areas create a checkerboard pattern.

* * * * *